United States Patent
Yu

(10) Patent No.: US 12,095,604 B2
(45) Date of Patent: Sep. 17, 2024

(54) INFORMATION SENDING AND RECEIVING METHODS AND APPARATUSES

(71) Applicant: HUAWEI TECHNOLOGIES CO., LTD., Guangdong (CN)

(72) Inventor: Jian Yu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 394 days.

(21) Appl. No.: 17/466,637

(22) Filed: Sep. 3, 2021

(65) Prior Publication Data

US 2021/0399930 A1    Dec. 23, 2021

Related U.S. Application Data

(63) Continuation of application No. PCT/CN2020/077485, filed on Mar. 2, 2020.

(30) Foreign Application Priority Data

Mar. 6, 2019   (CN) .......................... 201910169504.9

(51) Int. Cl.
*H04L 27/20*   (2006.01)
*H04L 5/00*    (2006.01)
(Continued)

(52) U.S. Cl.
CPC .......... *H04L 27/2085* (2013.01); *H04L 5/001* (2013.01); *H04W 80/02* (2013.01); *H04W 84/12* (2013.01)

(58) Field of Classification Search
CPC .... H04L 27/2085; H04L 5/001; H04W 80/02; H04W 84/12
See application file for complete search history.

(56) References Cited

U.S. PATENT DOCUMENTS

| 10,194,006 B2* | 1/2019 | Zhang .................. H04W 84/12 |
| 2011/0110348 A1* | 5/2011 | Lee ........................ H04L 1/0061 370/338 |

(Continued)

FOREIGN PATENT DOCUMENTS

| CN | 1832480 A | 9/2006 |
| CN | 105637780 A | 6/2016 |
| CN | 106605382 A | 4/2017 |

OTHER PUBLICATIONS

IEEE Std 802.11-2016 (Revision of IEEE Std 802.11-2012), IEEE Standard for Information technology—Telecommunications and Information Exchange Between Systems Local and Metropolitan Area Networks—Specific Requirements, Part 11: Wireless LAN Medium Access Control (MAC) and Physical Layer (PHY) Specifications, Prepared by the 802.11 Working Group of the LAN/MAN Standards Committee of the IEEE Computer Society, Dec. 7, 2016, 3534 pages.

(Continued)

*Primary Examiner* — Duc C Ho
(74) *Attorney, Agent, or Firm* — Fish & Richardson P.C.

(57) ABSTRACT

This application provides information sending and receiving methods and apparatuses. This application provides a new PPDU format. In some instances, a long training sequence in the new PPDU format is orthogonal to a legacy long training sequence or orthogonal to a high throughput long training sequence. By using this long training sequence, a format of a PPDU can be automatically detected, so as to further process the PPDU according to a network standard corresponding to the format of the PPDU. In addition, when a target long training field is read, the format of the PPDU can be detected, thereby, in at least some implementations, saving time for detecting the format of the PPDU, improving efficiency of detecting the format of the PPDU, and com- (Continued)

pleting a task of detecting the format of the PPDU as early as possible.

16 Claims, 10 Drawing Sheets

(51) Int. Cl.
*H04W 80/02* (2009.01)
*H04W 84/12* (2009.01)

(56) References Cited

U.S. PATENT DOCUMENTS

| 2014/0307650 | A1* | 10/2014 | Vermani | H04L 27/2613 370/329 |
| 2017/0141899 | A1* | 5/2017 | Lu | H04L 5/0023 |
| 2018/0139617 | A1* | 5/2018 | Belghoul | H04W 16/14 |

OTHER PUBLICATIONS

IEEE Std 802.11ac-2013, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz Sponsor," LAN/MAN Standards Committee of the IEEE Computer Society, Dec. 11, 2013, 425 pages.

IEEE Std 802.11ah-2016, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," LAN/MAN Standards Committee of the IEEE Computer Society, Dec. 7, 2016, 594 pages.

IEEE P802.11ax/D2.2, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Enhancements for High Efficiency WLAN, Prepared by the 802.11 Working Group of the LAN/MAN Standards Committee of the IEEE Computer Society, Feb. 2018, 620 pages.

PCT International Search Report and Written Opinion issued in International Application No. PCT/CN2020/077485 on May 25, 2020, 19 pages (with English translation).

Porat et al., "32FFT STF/LTF Sequences," Doc.: IEEE 802.11-12/0115r0, Jan. 2012, 12 pages.

* cited by examiner

Phase:

| Target short training field | Target long training field | QBPSK | | M is a positive integer |
|---|---|---|---|---|
| | | A first symbol of target signaling field | A second symbol to an $M^{th}$ symbol of the target signaling field | Data field |

Number of symbols:

| 2 | 2 | 1 | (M−1) | |

Duration:

| 8 μs | 8 μs | 4 μs | (M−1)*4 μs | |

FIG. 4

Phase:

| | | QBPSK | | M and N are positive integers |
|---|---|---|---|---|
| Extremely high throughput greenfield short training field (GF-EHT-STF) | Extremely high throughput greenfield long training field (GF-EHT-LTF) | A first symbol of an extremely high throughput signaling field (EHT-SIG-A0) | A second symbol to an $M^{th}$ symbol of the extremely high throughput signaling field (EHT-SIG-A1-M) | Extremely high throughput greenfield long training field 1 to extremely high throughput greenfield long training field N (GF-EHT-LTF1-N) | ... | Data field |

Number of symbols: 2　2　1　(M−1)　N

Duration: 8 μs　8 μs　4 μs　(M−1)*4 μs　N*4/8/16 μs

FIG. 5

| Phase: | | QBPSK | QBPSK/BPSK | | | M is a positive integer |
|---|---|---|---|---|---|---|
| | Legacy short training field (L-STF) | Legacy long training field (L-LTF) | A first symbol of an extremely high throughput signaling field (EHT-SIG-A0) | A second symbol of the extremely high throughput signaling field (EHT-SIG-A1) | A third symbol to an $M^{th}$ symbol of the extremely high throughput signaling field (EHT-SIG-A3-M) | ... | Data field |
| Number of symbols: | 2 | 2 | 1 | 1 | (M–3) | | |
| Duration | 8 μs | 8 μs | 4 μs | 4 μs | (M–3)*4 μs | | |

FIG. 10

| Phase: | | | Feature information<br>QBPSK ↘ | | | M is a positive integer |
|---|---|---|---|---|---|---|
| | Legacy short training field (L-STF) | Legacy long training field (L-LTF) | A first symbol of an extremely high throughput signaling field (EHT-SIG-A0) | A second symbol to an Mth symbol of the extremely high throughput signaling field (EHT-SIG-A1-M) | ... | Data field |
| Number of symbols: | 2 | 2 | 1 | (M–1) | | |
| Duration | 8 μs | 8 μs | 4 μs | (M–1)*4 μs | | |

FIG. 13

INFORMATION SENDING AND RECEIVING METHODS AND APPARATUSES

CROSS-REFERENCE TO RELATED APPLICATIONS

This application is a continuation of International Application No. PCT/CN2020/077485, filed on Mar. 2, 2020, which claims priority to Chinese Patent Application No. 201910169504.9, filed on Mar. 6, 2019. The disclosures of the aforementioned applications are hereby incorporated by reference in their entireties.

TECHNICAL FIELD

This application relates to the field of communications technologies, and more specifically, to information sending and receiving methods and apparatuses.

BACKGROUND

With development of communication technologies, standards of wireless local area networks (English full name: wireless local area networks, English abbreviation: WLAN) are evolving from the Institute of Electrical and Electronics Engineers (English full name: the institute of electrical and electronics engineers, English abbreviation: IEEE) 802.11a/b/g to IEEE 802.11n, IEEE 802.11ac, to IEEE 802.11ax that is now in discussion. Each generation of the standards provides a new physical layer protocol data unit. (English full name: physical protocol data unit, English abbreviation: PPDU) format to support better information transmission through the new PPDU format.

The PPDU includes a preamble portion and a data portion. The preamble portion includes a short training field (English full name: short training field, English abbreviation: STF), a long training field (English full name: long training field, English abbreviation: LTF) and a signaling field (English full name: signaling field, English abbreviation: SIG). The STF has a short training sequence, the LTF has a long training sequence, and the SIG has transmission rate of the data portion and a length of the PPDU. The data portion contains information that needs to be transmitted.

In an information transmission process, an information sending apparatus generates a PPDU in a corresponding PPDU format based on the format of PPDU specified in the WLAN standard, and sends the PPDU. When receiving a data unit, an information receiving apparatus reads the preamble portion of the PPDU to determine the format of the PPDU, and performs further processing procedures such as decoding the data portion of the PPDU according to the WLAN standard corresponding to the format of the PPDU.

With the advent of a next-generation WLAN standard, a new format of PPDU needs to be urgently provided for the next-generation of WLAN standard, so that the format of the PPDU can be determined when the new format of PPDU is received. The PPDU can be further processed according to the WLAN standard corresponding to the format of PPDU to meet an information transmission requirement of the next-generation WLAN standard.

SUMMARY

Embodiments of this application provide an information sending method and apparatus and an information receiving method and apparatus, to resolve a technical problem that a new PPDU format is urgently required in a related technology to meet an information transmission requirement of a next generation WLAN standard. The technical solutions are as follows:

According to a first aspect, an information sending method is provided, where the method includes:

generating a physical layer protocol data unit PPDU, the PPDU including a target long training sequence, where the target long training sequence is orthogonal to a legacy long training sequence or orthogonal to a high throughput long training sequence; and sending the PPDU.

The method provided in this embodiment provides a new PPDU format, and a long training sequence in the PPDU in the new format is orthogonal to the legacy long training sequence or orthogonal to the high throughput long training sequence. When the PPDU in this format is received, the PPDU format can be automatically detected by using the long training sequence, to perform further processing on the PPDU based on a WLAN standard corresponding to the PPDU format. In addition, when the target long training field is read, the PPDU format can be detected. Compared with a method of detecting the PPDU format by reading a signaling field, a time for detecting the PPDU format is saved, efficiency of detecting the PPDU format is improved, and detection can be completed as soon as possible. In addition, by using the new long training sequence, the PPDU format provided in this embodiment can be distinguished from a PPDU format of each generation WLAN standard, to ensure accuracy of identifying the PPDU format, and prevent the PPDU format from being confused with a PPDU format of a previous WLAN standard, thereby meeting an information transmission requirement of a next generation WLAN standard.

In a possible implementation, the target long training sequence is obtained by splicing at least two $P_{32}$ sequences, and the $P_{32}$ sequence is orthogonal to an upper part of the legacy long training sequence or the high throughput long training sequence and orthogonal to a lower part of the legacy long training sequence or the high throughput long training sequence.

In a possible implementation, an expression of the $P_{32}$ sequence is as follows:

$$p_{32}=[0\ 0\ 0\ 1\ -1\ 1\ -1\ -1\ 1\ -1\ 1\ 1\ 1\ -1\ 1\ 1\ 1\ 0\ -1\ -1\ -1\ 1\ -1\ -1\ -1\ 1\ -1\ 1\ 1\ 1\ -1\ 0\ 0].$$

In a possible implementation, the target long training sequence is a linear combination of at least two $P_{32}$ sequences.

In a possible implementation, a coefficient of each $P_{32}$ sequence is 1 or -1.

In a possible implementation, the number of $P_{32}$ sequences in the target long training sequence is determined based on a bandwidth of the PPDU.

In a possible implementation, if the bandwidth is 20 MHz, the target long training sequence may be a linear combination of two $P_{32}$ sequences; and if the bandwidth is (20*N) MHz, the target long training sequence is a linear combination of (2*N) $P_{32}$ sequences. N is a positive integer greater than 1.

In a possible implementation, one or more positions in one or more $P_{32}$ sequences in the target long training sequence have been filled in, and the filling in refers to replacing a value of 0 in the $P_{32}$ sequence with 1 or -1.

In a possible implementation, an intermediate position of the $P_{32}$ sequence in the target long training sequence has been filled in.

Through this optional implementation, an effect achieved may include at least: The intermediate position of the $P_{32}$ sequence is originally a position corresponding to a direct current component at a bandwidth of 1 MHz (English full name: megahertz, English abbreviation: MHz), and the intermediate position of the $P_{32}$ sequence is originally set to 0 to remove a direct current component in a spectrum. However, when the target long training sequence is constructed, the position corresponding to the direct current component has been switched from the intermediate position of the $P_{32}$ sequence to another position. If the intermediate position of the $P_{32}$ sequence is still set to 0, a waste of spectrum resources is caused. By filling in the intermediate position of the $P_{32}$ sequence, a subcarrier at the intermediate position of the $P_{32}$ sequence may be used, thereby saving spectrum resources.

In a possible implementation, an edge position of the $P_{32}$ sequence in the target long training sequence has been filled in.

In a possible implementation, the edge position is any one or a combination of $P_{32}(-15)$, $P_{32}(-14)$, $P_{32}(14)$, and $P_{32}(15)$.

Through this optional implementation, an effect achieved may include at least: The edge position of the $P_{32}$ sequence is originally a position corresponding to an edge subcarrier at a bandwidth of 1 MHz, and the edge position of the $P_{32}$ sequence is originally set to 0 to avoid adjacent band interference. However, when the target long training sequence is constructed, a part of the edge position of the $P_{32}$ sequence has been switched from a position corresponding to the edge subcarrier to positions at the left and right of the intermediate position of the target long training sequence. If the edge position of the $P_{32}$ sequence is still set to 0, a spectrum waste is caused. However, by filling in the edge position of the $P_{32}$ sequence, a subcarrier at the edge position of the $P_{32}$ sequence may be used, thereby saving spectrum resources.

In a possible implementation, if the bandwidth is equal to 20 MHz, an expression of the target long training sequence is any one of the following:

$L_{64}=[p_{32},p_{32}]$;

$L_{64}=[p_{32},-p_{32}]$;

$L_{64}=[-p_{32},p_{32}]$;

$L_{64}=[-p_{32},-p_{32}]$;

$L_{64}=[p_{32}(-16,-1),x1,p_{32}(1,13),-1,1,0,-1,-1,p_{32}(-13,-1),x2,p_{32}(1,15)]$;

$L_{64}=[p_{32}(-16,-1),x1,p_{32}(1,13),1,-1,0,1,1,p_{32}(-13,-1),x2,p_{32}(1,15)]$;

$L_{64}=[p_{32}(-16,-1),x1,p_{32}(1,13),1,1,p_{32}(-13,-1),x2,p_{32}(1,15)]$;

$L_{64}=[p_{32}(-16,-1),0,p_{32}(1,13),1,1,0,-1,-1,p_{32}(-13,-1),0,p_{32}(1,15)]$;

$L_{64}=[p_{32}(-16,-1),1,p_{32}(1,13),0,0,0,0,0,p_{32}(-13,-1),1,p_{32}(1,15)]$;

$L_{64}=[p_{32}(-16,-1),0,p_{32}(1,13),-1,1,0,-1,-1,p_{32}(-13,-1),0,p_{32}(1,15)]$;

$L_{64}=[p_{32}(-16,-1),0,p_{32}(1,13),1,-1,0,1,1,p_{32}(-13,-1),0,p_{32}(1,15)]$;

$L_{64}=[p_{32}(-16,-1),0,p_{32}(1,13),1,-1,0,1,-1,p_{32}(-13,-1),0,p_{32}(1,15)]$; and $L_{64}=[p_{32}(-16,-1),0,p_{32}(1,13),1,1,0,-1,-1,p_{32}(-13,-1),0,p_{32}(1,15)]$;

where $L_{64}$ represents a target long training sequence whose length is 64, x1 is −1 or 1, x2 is −1, $p_{32}$=[0 0 0 1 −1 1 −1 −1 1 −1 1 1 −1 1 1 1 0 −1 −1 −1 1 −1 −1 −1 1 −1 1 1 −1 0 0], $p_{32}(-16,-1)$ represents a sequence that is from a value whose sequence number is −16 in $p_{32}$ to a value whose sequence number is −1 in $p_{32}$, $p_{32}(1,13)$ represents a sequence that is from a value whose sequence number is 1 in $p_{32}$ to a value whose sequence number is 13 in $p_{32}$, $p_{32}(-13,-1)$ represents a sequence that is from a value whose sequence number is −13 in $p_{32}$ to a value whose sequence number is −1 in $p_{32}$, and $p_{32}(1,15)$ represents a sequence that is from a value whose sequence number is 1 in $p_{32}$ to a value whose sequence number is 15 in $p_{32}$.

In a possible implementation, if the bandwidth is greater than 20 MHz, an expression of the target long training sequence is any one of the following:

$L_k=[a_1 L_{64} a_2 L_{64}, \ldots a_k L_{64}]$;

$L_{64}=[p_{32},p_{32}]$;

$L_{64}=[p_{32},-p_{32}]$;

$L_{64}=[-p_{32},p_{32}]$;

$L_{64}=[-p_{32},-p_{32}]$;

$L_{64}=[p_{32}(-16,-1),x1,p_{32}(1,13),-1,1,0,-1,-1,p_{32}(-13,-1),x2,p_{32}(1,15)]$;

$L_{64}=[p_{32}(-16,-1),x1,p_{32}(1,13),1,-1,0,1,1,p_{32}(-13,-1),x2,p_{32}(1,15)]$;

$L_{64}=[p_{32}(-16,-1),x1,p_{32}(1,13),1,-1,0,-1,-1,p_{32}(-13,-1),x2,p_{32}(1,15)]$;

$L_{64}=[p_{32}(-16,-1),0,p_{32}(1,13),1,1,0,-1,-1,p_{32}(-13,-1),0,p_{32}(1,15)]$;

$L_{64}=[p_{32}(-16,-1),1,p_{32}(1,13),0,0,0,0,0,p_{32}(-13,-1),1,p_{32}(1,15)]$;

$L_{64}=[p_{32}(-16,-1),0,p_{32}(1,13),-1,1,0,-1,-1,p_{32}(-13,-1),0,p_{32}(1,15)]$;

$L_{64}=[p_{32}(-16,-1),0,p_{32}(1,13),1,-1,0,1,1,p_{32}(-13,-1),0,p_{32}(1,15)]$;

$L_{64}=[p_{32}(-16,-1),0,p_{32}(1,13),1,-1,0,1,-1,p_{32}(-13,-1),0,p_{32}(1,15)]$; and $L_{64}=[p_{32}(-16,-1),0,p_{32}(1,13),1,1,0,-1,-1,p_{32}(-13,-1),0,p_{32}(1,15)]$;

where $L_k$ represents a target long training sequence, k is a ratio of the bandwidth of the PPDU to 20 MHz and is a positive integer greater than or equal to 1, $a_1$, $a_2$, and $a_k$ are −1 or 1, $L_{64}$ represents a target long training sequence whose length is 64, x1 is −1 or 1, x2 is −1, $p_{32}$=[0 0 0 1 −1 1 −1 1 1 1 −1 1 1 1 1 0 −1 −1 −1 1 −1 −1 −1 1 −1 1 1 1 −1 0 0], $p_{32}(-16,-1)$ represents a sequence that is from a value whose sequence number is −16 in $p_{32}$ to a value whose sequence number is −1 in $p_{32}$, $p_{32}(1,13)$ represents a sequence that is from a value whose sequence number is 1 in $p_{32}$ to a value whose sequence number is 13 in $p_{32}$, $p_{32}(-13,-1)$ represents a sequence that is from a value whose sequence number is −13 in $p_{32}$ to a value whose sequence number is −1 in $p_{32}$, and $p_{32}(1, 15)$ represents a sequence that is from a value whose sequence number is 1 in $p_{32}$ to a value whose sequence number is 15 in $p_{32}$.

Through this optional implementation, an effect achieved may include at least: Information transmission scenarios in a plurality of bandwidths may be supported, thereby improving flexibility.

In a possible implementation, the target long training sequence is in a target long training field of the PPDU, and a formula of a signal of the target long training field is as follows:

$$r_{EHT-GF-LTF}^{(i_{TX})}(t) = \frac{1}{\sqrt{N_{STS} \cdot N_{EHT-GF-LTF}^{Tone}}}$$

$$w_{T_{EHT-GF-LTF}}(t) * \sum_{k=-N_{SR}}^{N_{SR}} \sum_{i_{STS}=1}^{N_{STS}} [Q_k]_{i_{TX}, i_{STS}} [P_{EHT-LTF}]_{i_{STS}, 1}$$

$$\gamma_k L_k \exp(j2\pi k \Delta_F (t - T_{GI} - T_{CS}^{i_{STS}})),$$

where $r_{EHT-GF-LTF}$: represents the signal, t represents time, $i_{TX}$ represents an index of an antenna and is a positive integer greater than or equal to 1, STS represents a space-time stream, * represents multiplication, $N_{STS}$ represents a number of space-time streams, $N_{EHT-GF-LTF}^{Tone}$ represents a number of subcarriers with energy in the target long training field, $N_{EHT-GF-LTF}^{Tone}$ represents a window function of the target long training field, $N_{SR}$ represents an index of a highest data subcarrier among all data subcarriers of the target long training field, exp( ) represents obtaining an exponent, $T_{CS}^{i_{STS}}$ represents duration of a circular shift, $\gamma_k$ represents a phase rotation factor, $P_{EHT-LTF}$ represents a mapping matrix of the target long training field, $Q_k$ represents a precoding matrix of a $k^{th}$ subcarrier, where k is a positive integer, $\Delta_F$ represents a subcarrier spacing of the target long training field, and $T_{GI}$ represents a guard interval.

In a possible implementation, a modulation scheme of a first symbol following the target long training field in the PPDU is quadrature binary phase shift keying (English full name: quadrature binary phase shift keying, English abbreviation: QBPSK).

Through this optional implementation, an effect achieved may include at least: On the basis that the PPDU format is distinguished from another PPDU format by using the target long training sequence, the difference between the PPDU format and the another PPDU format can be expanded by designing the modulation scheme of the first symbol as QBPSK, so that the PPDU format can be further determined based on whether the modulation scheme of the first symbol following the target long training field is QBPSK, thereby helping detect the PPDU format and improving accuracy of detecting the PPDU format.

In a possible implementation, the PPDU includes a target signaling field, the target signaling field is a first field following the target long training field, an information bandwidth of the target signaling field is greater than 20 MHz, and the information bandwidth refers to a basic bandwidth for carrying information coding.

Through this optional implementation, an effect achieved may include at least: by expanding the information bandwidth of the target signaling field from 20 MHz to be greater than 20 MHz, information carried by a single symbol may be increased exponentially. Therefore, when information about the target signaling field is sent, the number of symbols that need to be occupied may be reduced exponentially, thereby greatly improving information transmission efficiency of the target signaling field.

According to a second aspect, an information receiving method is provided, where the method includes:

receiving a data unit; and determining, when a long training sequence in the data unit meets a first condition, that the data unit is a physical layer protocol data unit PPDU in a preset format, where the PPDU includes a target long training sequence, and the target long training sequence is orthogonal to a legacy long training sequence or orthogonal to a high throughput long training sequence.

The method provided in this embodiment provides a new PPDU format, and a long training sequence in the PPDU in the new format is orthogonal to the legacy long training sequence or orthogonal to the high throughput long training sequence. By using the PPDU in this format, the PPDU format can be automatically detected by using the long training sequence, to perform further processing on the PPDU based on a WLAN standard corresponding to the PPDU format. In addition, when the target long training field is read, the PPDU format can be detected. Compared with a method of detecting the PPDU format by reading a signaling field, a time for detecting the PPDU format is saved, efficiency of detecting the PPDU format is improved, and detection can be completed as soon as possible. In addition, by using the new long training sequence, the PPDU format provided in this embodiment can be distinguished from a PPDU format of each generation WLAN standard, to ensure accuracy of identifying the PPDU format, and prevent the PPDU format from being confused with a PPDU format of a previous WLAN standard, thereby meeting an information transmission requirement of a next generation WLAN standard.

In a possible implementation, the determining, when the data unit meets a first condition, that the data unit is a physical layer protocol data unit PPDU in a preset format includes: performing cross-correlation between the long training sequence in the data unit and a prestored target long training sequence to obtain a first result, where the prestored target long training sequence is orthogonal to a legacy long training sequence or a high throughput long training sequence; and when the first result is greater than a first threshold, determining that the data unit is the physical layer protocol data unit PPDU in the preset format.

In a possible implementation, the determining, when the data unit meets a first condition, that the data unit is a physical layer protocol data unit PPDU in a preset format includes: performing cross-correlation between the long training sequence in the data unit and a prestored target long training sequence to obtain a first result, where the prestored target long training sequence is orthogonal to a legacy long training sequence or a high throughput long training sequence; performing cross-correlation between the long training sequence in the data unit and the legacy long training sequence or the high throughput long training sequence to obtain a second result; and determining, when the first result and the second result meet a preset magnitude relationship, that the data unit is the physical layer protocol data unit PPDU in the preset format.

In a possible implementation, the preset magnitude relationship is that the first result is greater than or equal to the second result; or the preset magnitude relationship is that the first result is greater than a product of the second result and a preset coefficient.

In a possible implementation, after the receiving a data unit, the method further includes: obtaining a signal to interference plus noise ratio of at least one subcarrier of a target long training field of the data unit, where the target long training field includes a long training sequence; and selecting a target subcarrier from the at least one subcarrier based on the signal to interference plus noise ratio of the at least one subcarrier, where the target subcarrier meets a second condition; the performing cross-correlation between the long training sequence in the data unit and a prestored target long training sequence includes: performing cross-correlation between the long training sequence in the data unit and the prestored target long training sequence based on the target subcarrier; and the performing cross-correlation between the long training sequence in the data unit and the legacy long training sequence or the high throughput long training sequence includes: performing cross-correlation between the long training sequence in the data unit and the legacy long training sequence or the high throughput long training sequence based on the target subcarrier.

In a possible implementation, the method further includes: obtaining a first sequence based on the target subcarrier, where the first sequence is a sequence that is in the long training sequence and that is carried by the target subcarrier; the performing cross-correlation between the long training sequence in the data unit and the prestored target long training sequence based on the target subcarrier includes: obtaining a second sequence based on the first sequence, where the second sequence is a sequence that is in the target long training sequence and that corresponds to the first sequence in position; and performing cross-correlation between the first sequence and the second sequence; and the performing cross-correlation between the long training sequence in the data unit and the legacy long training sequence or the high throughput long training sequence based on the target subcarrier includes: obtaining a third sequence based on the first sequence, where the third sequence is a sequence that is in the legacy long training sequence or the high throughput long training sequence and that corresponds to the first sequence in position; and performing cross-correlation between the first sequence and the third sequence.

In a possible implementation, the target long training sequence is obtained by splicing at least two $P_{32}$ sequences. The $P_{32}$ sequence is orthogonal to an upper part of the legacy long training sequence or the high throughput long training sequence and orthogonal to a lower part of the legacy long training sequence or the high throughput long training sequence.

In a possible implementation, an expression of the $P_{32}$ sequence is as follows:

$p_{32}$=[0 0 0 1 −1 1 −1 1 1 −1 1 1 −1 1 1 1 0 −1 −1 −1 1 −1 −1 −1 1 −1 1 1 1 −1 0 0].

In a possible implementation, the target long training sequence is a linear combination of at least two $P_{32}$ sequences.

In a possible implementation, a coefficient of each $P_{32}$ sequence is 1 or −1.

In a possible implementation, the number of $P_{32}$ sequences in the target long training sequence is determined based on a bandwidth of the PPDU.

In a possible implementation, if the bandwidth is 20 MHz, the target long training sequence may be a linear combination of two $P_{32}$ sequences; and if the bandwidth is (20*N) MHz, the target long training sequence is a linear combination of (2*N) $P_{32}$ sequences. N is a positive integer greater than 1.

In a possible implementation, one or more positions in one or more $P_{32}$ sequences in the target long training sequence have been filled in, and the filling in refers to replacing a value of 0 in the $P_{32}$ sequence with 1 or −1.

In a possible implementation, an intermediate position of the $P_{32}$ sequence in the target long training sequence has been filled in.

Through this optional implementation, an effect achieved may include at least: The intermediate position of the $P_{32}$ sequence is originally a position corresponding to a direct current component at a bandwidth of 1 MHz, and the intermediate position of the $P_{32}$ sequence is originally set to 0 to remove a direct current component in a spectrum. However, when the target long training sequence is constructed, the position corresponding to the direct current component has been switched from the intermediate position of the $P_{32}$ sequence to another position. If the intermediate position of the $P_{32}$ sequence is still set to 0, a waste of spectrum resources is caused. By filling in the intermediate position of the $P_{32}$ sequence, a subcarrier at the intermediate position of the $P_{32}$ sequence may be used, thereby saving spectrum resources.

In a possible implementation, an edge position of the $P_{32}$ sequence in the target long training sequence has been filled in.

In a possible implementation, the edge position is any one or a combination of $P_{32}(-15)$, $P_{32}(-14)$, $P_{32}(14)$, and $P_{32}(15)$.

Through this optional implementation, an effect achieved may include at least: The edge position of the $P_{32}$ sequence is originally a position corresponding to an edge subcarrier at a bandwidth of 1 MHz, and the edge position of the $P_{32}$ sequence is originally set to 0 to avoid band interference. However, when the target long training sequence is constructed, a part of the edge position of the $P_{32}$ sequence has been switched from a position corresponding to the edge subcarrier to positions at the left and right of the intermediate position of the target long training sequence. If the edge position of the $P_{32}$ sequence is still set to 0, a spectrum waste is caused. However, by filling in the edge position of the $P_{32}$ sequence, a subcarrier at the edge position of the $P_{32}$ sequence may be used, thereby saving spectrum resources.

In a possible implementation, if the bandwidth is equal to 20 MHz, an expression of the target long training sequence is any one of the following:

$L_{64}=[p_{32},p_{32}]$;

$L_{64}=[p_{32},-p_{32}]$;

$L_{64}=[-p_{32},p_{32}]$;

$L_{64}=[-p_{32},-p_{32}]$;

$L_{64}=[p_{32}(-16,-1),x1,p_{32}(1,13),-1,1,0,-1,-1,p_{32}(-13,-1),x2,p_{32}(1,15)]$;

$L_{64}=[p_{32}(-16,-1),x1,p_{32}(1,13),1,-1,0,1,1,p_{32}(-13,-1),x2,p_{32}(1,15)]$;

$L_{64}=[p_{32}(-16,-1),x1,p_{32}(1,13),1,1,p_{32}(-13,-1),x2,p_{32}(1,15)]$;

$L_{64}=[p_{32}(-16,-1),0,p_{32}(1,13),1,1,0,-1,-1,p_{32}(-13,-1),0,p_{32}(1,15)]$;

$L_{64}=[p_{32}(-16,-1),1,p_{32}(1,13),0,0,0,0,0,p_{32}(-13,-1),1,p_{32}(1,15)]$;

$L_{64}=[p_{32}(-16,-1),0,p_{32}(1,13),-1,1,0,-1,-1,p_{32}(-13,-1),0,p_{32}(1,15)]$;

$L_{64}=[p_{32}(-16,-1),0,p_{32}(1,13),1,-1,0,1,1,p_{32}(-13,-1), 0,p_{32}(1,15)]$;

$L_{64}=[p_{32}(-16,-1),0,p_{32}(1,13),1,-1,0,1,-1,p_{32}(-13,-1),0,p_{32}(1,15)]$; and $L_{64}=[p_{32}(-16,-1),0,p_{32}(1,13),1,1,0,-1,-1,p_{32}(-13,-1),0,p_{32}(1,15)]$;

where $L_{64}$ represents a target long training sequence whose length is 64, x1 is −1 or 1, x2 is −1, $p_{32}$=[0 0 0 1 −1 1 −1 −1 1 −1 1 1 −1 1 1 1 0 −1 −1 −1 1 −1 −1 −1 1 −1 1 1 −1 0 0], $p_{32}(-16,-1)$ represents a sequence that is from a value whose sequence number is −16 in $p_{32}$ to a value whose sequence number is −1 in $p_{32}$, $p_{32}(1,13)$ represents a sequence that is from a value whose sequence number is 1 in $p_{32}$ to a value whose sequence number is 13 in $p_{32}$, $p_{32}(-13,-1)$ represents a sequence that is from a value whose sequence number is −13 in $p_{32}$ to a value whose sequence number is −1 in $p_{32}$, and $p_{32}(1, 15)$ represents a sequence that is from a value whose sequence number is 1 in $p_{32}$ to a value whose sequence number is 15 in $p_{32}$.

In a possible implementation, if the bandwidth is greater than 20 MHz, an expression of the target long training sequence is any one of the following:

$L_k=[a_1 L_{64} a_2 L_{64}, \ldots a_k L_{64}]$;

$L_{64}=[p_{32},p_{32}]$;

$L_{64}=[p_{32},-p_{32}]$;

$L_{64}=[-p_{32},p_{32}]$;

$L_{64}=[-p_{32},-p_{32}]$;

$L_{64}=[p_{32}(-16,-1),x1,p_{32}(1,13),-1,1,0,-1,-1,p_{32}(-13,-1),x2,p_{32}(1,15)]$;

$L_{64}=[p_{32}(-16,-1),x1,p_{32}(1,13),1,-1,0,1,1,p_{32}(-13,-1),x2,p_{32}(1,15)]$;

$L_{64}=[p_{32}(-16,-1),x1,p_{32}(1,13),1,-1,0,1,-1,p_{32}(-13,-1),x2,p_{32}(1,15)]$;

$L_{64}=[p_{32}(-16,-1),0,p_{32}(1,13),1,1,0,-1,-1,p_{32}(-13,-1),0,p_{32}(1,15)]$;

$L_{64}=[p_{32}(-16,-1),1,p_{32}(1,13),0,0,0,0,0,p_{32}(-13,-1),1,p_{32}(1,15)]$;

$L_{64}=[p_{32}(-16,-1),0,p_{32}(1,13),-1,1,0,-1,-1,p_{32}(-13,-1),0,p_{32}(1,15)]$;

$L_{64}=[p_{32}(-16,-1),0,p_{32}(1,13),1,-1,0,1,1,p_{32}(-13,-1),0,p_{32}(1,15)]$;

$L_{64}=[p_{32}(-16,-1),0,p_{32}(1,13),1,-1,0,1,-1,p_{32}(-13,-1),0,p_{32}(1,15)]$; and $L_{64}=[p_{32}(-16,-1),0,p_{32}(1,13),1,1,0,-1,-1,p_{32}(-13,-1),0,p_{32}(1,15)]$;

where $L_k$ represents a target long training sequence, k is a ratio of the bandwidth of the PPDU to 20 MHz and is a positive integer greater than or equal to 1, $a_1$, $a_2$, and $a_k$ are −1 or 1, $L_{64}$ represents a target long training sequence whose length is 64, x1 is −1 or 1, x2 is −1, $p_{32}$=[0 0 0 1 −1 1 −1 −1 1 −1 1 1 1 −1 1 1 1 0 −1 −1 −1 1 −1 −1 −1 1 −1 1 1 1 −1 0 0], $p_{32}(-16,-1)$ represents a sequence that is from a value whose sequence number is −16 in $p_{32}$ to a value whose sequence number is −1 in $p_{32}$, $p_{32}(1,13)$ represents a sequence that is from a value whose sequence number is 1 in $p_{32}$ to a value whose sequence number is 13 in $p_{32}$, $p_{32}(-13, -1)$ represents a sequence that is from a value whose sequence number is −13 in $p_{32}$ to a value whose sequence number is −1 in $p_{32}$, and $p_{32}(1, 15)$ represents a sequence that is from a value whose sequence number is 1 in $p_{32}$ to a value whose sequence number is 15 in $p_{32}$.

In a possible implementation, the target long training sequence is in a target long training field of the PPDU, and a formula of a signal of the target long training field is as follows:

$$r_{EHT-GF-LTF}^{(i_{TX})}(t) = \frac{1}{\sqrt{N_{STS} \cdot N_{EHT-GF-LTF}^{Tone}}}$$

$$w_{T_{EHT-GF-LTF}}(t) * \sum_{k=-N_{SR}}^{N_{SR}} \sum_{i_{STS}=1}^{N_{STS}} [Q_k]_{i_{TX},i_{STS}} [P_{EHT-LTF}]_{i_{STS},1}$$

$$\gamma_k L_k \exp(j2\pi k \Delta_F (t - T_{GI} - T_{CS}^{i_{STS}}))$$

where $r_{EHT-GF-LTF}$ represents the signal, t represents time, $i_{TX}$ represents an index of an antenna and is a positive integer greater than or equal to 1, STS represents a space-time stream, * represents multiplication, $N_{STS}$ represents a number of space-time streams, $N_{EHT-GF-LTF}^{Tone}$ represents a number of subcarriers with energy in the target long training field, $w_{T_{EHT-GF-LTF}}(t)$ represents a window function of the target long training field, $N_{SR}$ represents an index of a highest data subcarrier among all data subcarriers of the target long training field, exp( ) represents obtaining an exponent, $T_{CS}^{i_{STS}}$ represents duration of a circular shift, $\gamma_k$ represents a phase rotation factor, $P_{EHT-LTF}$ represents a mapping matrix of the target long training field, $Q_k$ represents a precoding matrix of a $k^{th}$ subcarrier, where k is a positive integer, $\Delta_F$ represents a subcarrier spacing of the target long training field, and $T_{GI}$ represents a guard interval.

In a possible implementation, a modulation scheme of a first symbol following the target long training field in the PPDU is quadrature binary phase shift keying (QBPSK), and the target long training field includes the long training sequence.

In a possible implementation, the PPDU includes a target signaling field, the target signaling field is a first field following the target long training field, an information bandwidth of the target signaling field is greater than 20 MHz, the information bandwidth refers to a basic bandwidth for carrying information coding, and the target long training field includes the long training sequence.

In a possible implementation, the step of determining, when the first result and the second result meet a first condition, that the PPDU format is a preset format may be replaced by: determining, when the data unit meets the first condition and when the modulation scheme of the first symbol following the target long training field of the data unit is QBPSK, that the data unit is the physical layer protocol data unit PPDU in the preset format, where the target long training field includes the long training sequence.

Through this optional implementation, an effect achieved may include at least: On the basis that the PPDU format is distinguished from another PPDU format by using the target long training sequence, the difference between the PPDU format and the another PPDU format can be expanded by designing the modulation scheme of the first symbol as QBPSK, so that the PPDU format can be further determined based on whether the modulation scheme of the first symbol following the target long training field is QBPSK, thereby improving accuracy of detecting the PPDU format.

According to a third aspect, an information sending method is provided, where the method includes:

generating a PPDU, where the PPDU includes a target long training field, the target long training field includes a long training sequence of the PPDU, a modulation scheme of a first symbol following the target long training field is quadrature binary phase shift keying (QBPSK), and a second symbol following the target long training field meets a third condition; and sending the PPDU.

The third condition is that the second symbol is the same as the first symbol; or the third condition is that content of the second symbol is the same as content of the first symbol, a modulation scheme of the second symbol is the same as the modulation scheme of the first symbol, and an interleaver used for the second symbol is different from an interleaver used for the first symbol; or the third condition is that content of the second symbol is the same as content of the first symbol, a modulation scheme of the second symbol is the same as the modulation scheme of the first symbol, and the first symbol has been interleaved and the second symbol has not been interleaved; or the third condition is that a modulation scheme of the second symbol is binary phase shift keying BPSK.

The method provided in this embodiment provides a new PPDU format, the modulation scheme of the first symbol following the target long training field in the PPDU is QBPSK, and the second symbol following the target long training field meets the third condition. When a PPDU in the PPDU format is received, the PPDU format can be automatically detected based on a phase of the first symbol following the target long training field and whether the second symbol meets the third condition, and the PPDU format can be detected when the second symbol following the target long training field is read, thereby saving time overheads.

In a possible implementation, the PPDU includes a target short training field, the target short training field includes a short training sequence, and the target short training field is a legacy short training field.

Through this optional implementation, an effect achieved may include at least: By designing a field for carrying a short training sequence in the PPDU as a legacy short training field, impact on coarse synchronization of frequency and time for receiving the data unit after the legacy short training field is modified can be avoided.

In a possible implementation, the target long training field is a legacy long training field.

Through this optional implementation, an effect achieved may include at least: By designing a field for carrying a long training sequence in the PPDU as a legacy long training field, impact caused when accurate synchronization of frequency and time is performed on the received data unit after the legacy long training field is modified can be avoided.

According to a fourth aspect, an information receiving method is provided, where the method includes:

receiving a PPDU, where the PPDU includes a target long training field, and the target long training field includes a long training sequence of the PPDU; and when a modulation scheme of a first symbol following the target long training field is quadrature binary phase shift keying (QBPSK), and a second symbol following the target long training field meets a third condition, determining that the PPDU format is a preset format, where the third condition is that the second symbol is the same as the first symbol; or the third condition is that content of the second symbol is the same as content of the first symbol, a modulation scheme of the second symbol is the same as the modulation scheme of the first symbol, and an interleaver used for the second symbol is different from an interleaver used for the first symbol; or the third condition is that content of the second symbol is the same as content of the first symbol, a modulation scheme of the second symbol is the same as the modulation scheme of the first symbol, and the first symbol has been interleaved and the second symbol has not been interleaved; or the third condition is that a modulation scheme of the second symbol is binary phase shift keying BPSK.

The method provided in this embodiment provides a new PPDU format, the modulation scheme of the first symbol following the target long training field in the PPDU is QBPSK, and the second symbol following the target long training field meets the third condition. When a PPDU in the PPDU format is received, the PPDU format can be automatically detected based on a phase of the first symbol following the target long training field and whether the second symbol meets the third condition, and the PPDU format can be detected when the second symbol following the target long training field is read, thereby saving time overheads.

In a possible implementation, before the determining that the PPDU format is a preset format, the method further includes: de-interleaving the first symbol by using a first interleaver, to obtain first data; and de-interleaving the second symbol by using a second interleaver, to obtain second data, where the second interleaver is different from the first interleaver; and when the first data is the same as the second data, determining that the interleaver used for the second symbol is different from the interleaver used for the first symbol; or de-interleaving the first symbol to obtain first data; and when the first data is the same as the second symbol, determining that the first symbol has been interleaved and the second symbol has not been interleaved.

In a possible implementation, the PPDU includes a target short training field, the target short training field includes a short training sequence, and the target short training field is a legacy short training field.

Through this optional implementation, an effect achieved may include at least: By designing a field for carrying a short training sequence in the PPDU as a legacy short training field, impact caused when coarse synchronization of frequency and time is performed on the received data unit after the legacy short training field is modified can be avoided.

In a possible implementation, the target long training field is a legacy long training field.

Through this optional implementation, an effect achieved may include at least: By designing a field for carrying a long training sequence in the PPDU as a legacy long training field, impact caused when accurate synchronization of frequency and time is performed on the received data unit after the legacy long training field is modified can be avoided.

According to a fifth aspect, an information sending method is provided, where the method includes:

generating a PPDU, where the PPDU includes a target long training field, the target long training field includes a long training sequence of the PPDU, a modulation scheme of a first symbol following the target long training field is quadrature binary phase shift keying (QBPSK), the first symbol includes feature information, and the feature information is used to indicate that a PPDU format is a preset format; and sending the PPDU.

The method provided in this embodiment provides a new PPDU format, the modulation scheme of the first symbol following the target long training field in the PPDU is QBPSK, and the first symbol includes feature information. When the PPDU in this PPDU format is received, the PPDU format can be automatically detected by using a phase and the feature information of the first symbol following the target long training field, and when the first symbol following the target long training field is read, the PPDU format can be detected, thereby saving a time for detecting the PPDU format, and improving efficiency of detecting the PPDU format.

In a possible implementation, the feature information is carried in a signature field of the first symbol, and the signature field is a field at a preset position in the first symbol.

In a possible implementation, the PPDU includes a legacy short training field.

Through this optional implementation, an effect achieved may include at least: By designing a field for carrying a short training sequence in the PPDU as a legacy short training field, impact caused when coarse synchronization of frequency and time is performed on the received data unit after the legacy short training field is modified can be avoided.

In a possible implementation, the target long training field is a legacy long training field.

Through this optional implementation, an effect achieved may include at least: By designing a field for carrying a long training sequence in the PPDU as a legacy long training field, impact caused when accurate synchronization of frequency and time is performed on the received data unit after the legacy long training field is modified can be avoided.

According to a sixth aspect, an information receiving method is provided, where the method includes:

receiving a PPDU, where the PPDU includes a target long training field, and the target long training field includes a long training sequence of the PPDU; and when a modulation scheme of a first symbol following the target long training field is quadrature binary phase shift keying (QBPSK), and the first symbol includes feature information, determining that the PPDU format is a preset format, where the feature information is used to indicate that the PPDU format is the preset format.

The method provided in this embodiment provides a new PPDU format, the modulation scheme of the first symbol following the target long training field in the PPDU is QBPSK, and the first symbol includes feature information. The PPDU format can be automatically detected by using a phase and the feature information of the first symbol following the target long training field, and when the first symbol following the target long training field is read, the PPDU format can be detected, thereby saving a time for detecting the PPDU format, and improving efficiency of detecting the PPDU format.

In a possible implementation, before the determining that the PPDU format is a preset format, the method further includes: determining a signature field from the first symbol, where the signature field is a field at a preset position in the first symbol; and obtaining the feature information from the signature field.

In a possible implementation, the PPDU includes a legacy short training field.

Through this optional implementation, an effect achieved may include at least: By designing a field for carrying a short training sequence in the PPDU as a legacy short training field, impact caused when coarse synchronization of frequency and time is performed on the received data unit after the legacy short training field is modified can be avoided.

In a possible implementation, the target long training field is a legacy long training field.

Through this optional implementation, an effect achieved may include at least: By designing a field for carrying a long training sequence in the PPDU as a legacy long training field, impact caused when coarse synchronization of frequency and time is performed on the received data unit after the legacy long training field is modified can be avoided.

According to a seventh aspect, an information sending apparatus is provided, configured to perform the information sending method in the foregoing aspects or any possible implementation of the foregoing aspects. Specifically, the apparatus includes modules configured to perform the information sending method in the foregoing aspects or any possible implementation of the foregoing aspects.

According to an eighth aspect, an information receiving apparatus is provided, configured to perform the information receiving method in the foregoing aspects or any possible implementation of the foregoing aspects. Specifically, the apparatus includes modules configured to perform the information receiving method in the foregoing aspects or any possible implementation of the foregoing aspects.

According to a ninth aspect, an information sending apparatus is provided, where the apparatus includes a transceiver and a processor.

The processor is configured to invoke, from a memory, instructions stored in the memory and run the instructions, to generate a PPDU, where the PPDU includes a target long training sequence, and the target long training sequence is orthogonal to a legacy long training sequence or orthogonal to a high throughput long training sequence.

The processor is further configured to control the transceiver to send the PPDU.

In a possible implementation, the information sending apparatus further includes a memory, and the memory is configured to store instructions.

In a possible implementation, the memory may be integrated with the processor, or the memory and the processor are disposed separately.

In a specific implementation process, the memory may be a non-transitory (non-transitory) memory, for example, a read only memory (read only memory, ROM). The memory and the processor may be integrated on a same chip, or may be separately disposed on different chips. A type of the memory and a manner of disposing the memory and the processor are not limited in this embodiment of this application.

In a possible implementation, if the bandwidth is equal to 20 MHz, an expression of the target long training sequence is any one of the following:

$L_{64}=[p_{32},p_{32}]$;

$L_{64}=[p_{32},-p_{32}]$;

$L_{64}=[-p_{32},p_{32}]$;

$L_{64}=[-p_{32},-p_{32}]$;

$L_{64}=[p_{32}(-16,-1),x1,p_{32}(1,13),-1,1,0,-1,-1,p_{32}(-13,-1),x2,p_{32}(1,15)]$;

$L_{64}=[p_{32}(-16,-1),x1,p_{32}(1,13),1,-1,0,1,1,p_{32}(-13,-1),x2,p_{32}(1,15)]$;

$L_{64}=[p_{32}(-16,-1),x1,p_{32}(1,13),1,1,p_{32}(-13,-1),x2,p_{32}(1,15)]$;

$L_{64}=[p_{32}(-16,-1),0,p_{32}(1,13),1,1,0,-1,-1,p_{32}(-13,-1),0,p_{32}(1,15)]$;

$L_{64}=[p_{32}(-16,-1),1,p_{32}(1,13),0,0,0,0,0,p_{32}(-13,-1),1,p_{32}(1,15)]$;

$L_{64}=[p_{32}(-16,-1),0,p_{32}(1,13),-1,1,0,-1,-1,p_{32}(-13,-1),0,p_{32}(1,15)];$ $L_{64}=[p_{32}(-16,-1),0,p_{32}(1,13),1,-1,0,1,1,p_{32}(-13,-1),0,p_{32}(1,15)];$ $L_{64}=[p_{32}(-16,-1),0,p_{32}(1,13),1,-1,0,1,-1,p_{32}(-13,-1),0,p_{32}(1,15)];$ and $L_{64}=[p_{32}(-16,-1),0,p_{32}(1,13),1,1,0,-1,-1,p_{32}(-13,-1),0,p_{32}(1,15)];$ where $L_{64}$ represents a target long training sequence whose length is 64, x1 is −1 or 1, x2 is −1, $p_{32}$=[0 0 0 1 −1 1 −1 −1 1 −1 1 1 −1 1 1 1 0 −1 −1 −1 1 −1 −1 −1 1 −1 1 1 1 −1 0 0], $p_{32}(-16,-1)$ represents a sequence that is from a value whose sequence number is −16 in $p_{32}$ to a value whose sequence number is −1 in $p_{32}$, $p_{32}(1,13)$ represents a sequence that is from a value whose sequence number is 1 in $p_{32}$ to a value whose sequence number is 13 in $p_{32}$, $p_{32}(-13, -1)$ represents a sequence that is from a value whose sequence number is −13 in $p_{32}$ to a value whose sequence number is −1 in $p_{32}$, and $p_{32}(1, 15)$ represents a sequence that is from a value whose sequence number is 1 in $p_{32}$ to a value whose sequence number is 15 in $p_{32}$.

In a possible implementation, if the bandwidth is greater than 20 MHz, an expression of the target long training sequence is any one of the following:

$L_k=[a_1 L_{64}, a_2 L_{64}, \ldots a_k L_{64}];$ $L_{64}=[p_{32}, p_{32}];$ $L_{64}=[p_{32}, -p_{32}];$ $L_{64}=[-p_{32}, p_{32}];$ $L_{64}=[-p_{32}, -p_{32}];$ $L_{64}=[p_{32}(-16,-1),x1,p_{32}(1,13),-1,1,0,-1,-1,p_{32}(-13,-1),x2,p_{32}(1,15)];$ $L_{64}=[p_{32}(-16,-1),x1,p_{32}(1,13),1,-1,0,1,1,p_{32}(-13,-1),x2,p_{32}(1,15)];$ $L_{64}=[p_{32}(-16,-1),x1,p_{32}(1,13),1,-1,0,1,-1,p_{32}(-13,-1),x2,p_{32}(1,15)];$ $L_{64}=[p_{32}(-16,-1),0,p_{32}(1,13),1,1,0,-1,-1,p_{32}(-13,-1),0,p_{32}(1,15)];$ $L_{64}=[p_{32}(-16,-1),1,p_{32}(1,13),0,0,0,0,0,p_{32}(-13,-1),1,p_{32}(1,15)];$ $L_{64}=[p_{32}(-16,-1),0,p_{32}(1,13),-1,1,0,-1,-1,p_{32}(-13,-1),0,p_{32}(1,15)];$ $L_{64}=[p_{32}(-16,-1),0,p_{32}(1,13),1,-1,0,1,1,p_{32}(-13,-1),0,p_{32}(1,15)];$ $L_{64}=[p_{32}(-16,-1),0,p_{32}(1,13),1,-1,0,1,-1,p_{32}(-13,-1),0,p_{32}(1,15)];$ and $L_{64}=[p_{32}(-16,-1),0,p_{32}(1,13),1,1,0,-1,-1,p_{32}(-13,-1),0,p_{32}(1,15)];$ where $L_k$ represents a target long training sequence, k is a ratio of the bandwidth of the PPDU to 20 MHz and is a positive integer greater than or equal to 1, $a_1$, $a_2$, and $a_k$ are −1 or 1, $L_{64}$ represents a target long training sequence whose length is 64, x1 is −1 or 1, x2 is −1, $p_{32}$=[0 0 0 1 −1 1 −1 −1 1 −1 1 1 −1 1 1 1 0 −1 −1 −1 1 −1 −1 −1 1 −1 1 1 1 −1 0 0], $p_{32}(-16,-1)$ represents a sequence that is from a value whose sequence number is −16 in $p_{32}$ to a value whose sequence number is −1 in $p_{32}$, $p_{32}(1,13)$ represents a sequence that is from a value whose sequence number is 1 in $p_{32}$ to a value whose sequence number is 13 in $p_{32}$, $p_{32}(-13, -1)$ represents a sequence that is from a value whose sequence number is −13 in $p_{32}$ to a value whose sequence number is −1 in $p_{32}$, and $p_{32}(1, 15)$ represents a sequence that is from a value whose sequence number is 1 in $p_{32}$ to a value whose sequence number is 15 in $p_{32}$.

In a possible implementation, the target long training sequence is in a target long training field of the PPDU, and a formula of a signal of the target long training field is as follows:

$$r^{(i_{TX})}_{EHT-GF-LTF}(t) = \frac{1}{\sqrt{N_{STS} \cdot N^{Tone}_{EHT-GF-LTF}}}$$

$$w_{T_{EHT-GF-LTF}}(t) * \sum_{k=-N_{SR}}^{N_{SR}} \sum_{i_{STS}=1}^{N_{STS}} [Q_k]_{i_{TX}, i_{STS}} [P_{EHT-LTF}]_{i_{STS}, 1}$$

$$\gamma_k L_k \exp(j 2\pi k \Delta_F (t - T_{GI} - T^{i_{STS}}_{CS}))$$

where $r_{EHT-GF-LTF}$ represents the signal, t represents time, $i_{TX}$ represents an index of an antenna and is a positive integer greater than or equal to 1, STS represents a space-time stream, * represents multiplication, $N_{STS}$ represents a number of space-time streams, $N_{EHT-GF-LTF}(t)$ represents a number of subcarriers with energy in the target long training field, represents a window function of the target long training field, $N_{SR}$ represents an index of a highest data subcarrier among all data subcarriers of the target long training field, exp( ) represents obtaining an exponent, $T_{CS}^{i_{STS}}$ represents duration of a circular shift, $\gamma_k$ represents a phase rotation factor, $P_{EHT-LTF}$ represents a mapping matrix of the target long training field, $Q_k$ represents a precoding matrix of a $k^{th}$ subcarrier, where k is a positive integer, $\Delta_F$ represents a subcarrier spacing of the target long training field, and $T_{GI}$ represents a guard interval.

In a possible implementation, a modulation scheme of a first symbol following the target long training field in the PPDU is QBPSK.

In a possible implementation, the PPDU includes a target signaling field, the target signaling field is a first field following the target long training field, an information bandwidth of the target signaling field is greater than 20 MHz, and the information bandwidth refers to a basic bandwidth for carrying information coding.

According to a tenth aspect, an information receiving apparatus is provided, where the apparatus includes a transceiver and a processor.

The processor is configured to invoke, from a memory, instructions stored in the memory and run the instructions, to control the transceiver to receive a data unit.

The processor is configured to: determine, when a long training sequence in the data unit meets a first condition, that the data unit is a physical layer protocol data unit PPDU in a preset format, where the PPDU includes a target long training sequence, and the target long training sequence is orthogonal to a legacy long training sequence or orthogonal to a high throughput long training sequence.

In a possible implementation, the information sending apparatus further includes a memory, and the memory is configured to store instructions.

In a possible implementation, the memory may be integrated with the processor, or the memory and the processor are disposed separately.

In a specific implementation process, the memory may be a non-transitory (non-transitory) memory, for example, a read only memory (read only memory, ROM). The memory and the processor may be integrated on a same chip, or may be separately disposed on different chips. A type of the memory and a manner of disposing the memory and the processor are not limited in this embodiment of this application.

In a possible implementation, the processor is configured to: perform cross-correlation between the long training sequence in the data unit and a prestored target long training sequence, to obtain a first result, where the prestored target long training sequence is orthogonal to a legacy long training sequence or a high throughput long training sequence; and when the first result is greater than a first threshold, determine that the data unit is the physical layer protocol data unit PPDU in the preset format.

In a possible implementation, the processor is configured to: perform cross-correlation between the long training sequence in the data unit and a prestored target long training sequence, to obtain a first result, where the prestored target long training sequence is orthogonal to a legacy long training sequence or a high throughput long training sequence; perform cross-correlation between the long training sequence in the data unit and the legacy long training sequence or the high throughput long training sequence, to obtain a second result; and when the first result and the second result meet a preset magnitude relationship, determine that the data unit is the physical layer protocol data unit PPDU in the preset format.

In a possible implementation, the preset magnitude relationship is that the first result is greater than or equal to the second result; or the preset magnitude relationship is that the first result is greater than a product of the second result and a preset coefficient.

In a possible implementation, the processor is configured to obtain a signal to interference plus noise ratio of at least one subcarrier of a target long training field of the data unit, where the target long training field includes a long training sequence; and select a target subcarrier from the at least one subcarrier based on the signal to interference plus noise ratio of the at least one subcarrier, where the target subcarrier meets a second condition.

In a possible implementation, the processor is configured to: perform cross-correlation between the long training sequence in the data unit and the prestored target long training sequence based on the target subcarrier; and perform cross-correlation between the long training sequence in the data unit and the legacy long training sequence or the high throughput long training sequence based on the target subcarrier.

In a possible implementation, the processor is configured to: obtain a first sequence based on the target subcarrier, where the first sequence is a sequence that is in the long training sequence and that is carried by the target subcarrier; obtain a second sequence based on the first sequence, where the second sequence is a sequence that is in the target long training sequence and that corresponds to the first sequence in position; and perform cross-correlation between the first sequence and the second sequence.

In a possible implementation, the processor is configured to: obtain a third sequence based on the first sequence, where the third sequence is a sequence that is in the legacy long training sequence or the high throughput long training sequence and that corresponds to the first sequence in position; and perform cross-correlation between the first sequence and the third sequence.

According to an eleventh aspect, an information sending apparatus is provided, where the apparatus includes a transceiver and a processor.

The processor is configured to invoke, from a memory, instructions stored in the memory and run the instructions, to generate a PPDU, where the PPDU includes a target long training field, the target long training field includes a long training sequence of the PPDU, a modulation scheme of a first symbol following the target long training field is quadrature binary phase shift keying (QBPSK), and a second symbol following the target long training field meets a third condition.

The processor is further configured to control the transceiver to send the PPDU.

In a possible implementation, the information sending apparatus further includes a memory, and the memory is configured to store instructions.

In a possible implementation, the memory may be integrated with the processor, or the memory and the processor are disposed separately.

In a specific implementation process, the memory may be a non-transitory memory, for example, a read-only memory. The memory and the processor may be integrated on a same chip, or may be separately disposed on different chips. A type of the memory and a manner of disposing the memory and the processor are not limited in this embodiment of this application.

According to a twelfth aspect, an information receiving apparatus is provided, where the apparatus includes a transceiver and a processor.

The processor is configured to invoke, from a memory, instructions stored in the memory and run the instructions, to control the transceiver to receive a data unit.

The processor is further configured to: when a modulation scheme of a first symbol following the target long training field of the data unit is quadrature binary phase shift keying (QBPSK), and a second symbol following the target long training field meets a third condition, determine that a PPDU format is a preset format, where the target long training field includes a long training sequence.

The third condition is that the second symbol is the same as the first symbol; or the third condition is that content of the second symbol is the same as content of the first symbol, a modulation scheme of the second symbol is the same as the modulation scheme of the first symbol, and an interleaver used for the second symbol is different from an interleaver used for the first symbol; or the third condition is that content of the second symbol is the same as content of the first symbol, a modulation scheme of the second symbol is the same as the modulation scheme of the first symbol, and the first symbol has been interleaved, and the second symbol has not been interleaved; or the third condition is that a modulation scheme of the second symbol is binary phase shift keying BPSK.

The processor is further configured to control the transceiver to receive the PPDU.

In a possible implementation, the information receiving apparatus further includes a memory, and the memory is configured to store instructions.

In a possible implementation, the memory may be integrated with the processor, or the memory and the processor are disposed separately.

In a specific implementation process, the memory may be a non-transitory memory, for example, a read-only memory. The memory and the processor may be integrated on a same chip, or may be separately disposed on different chips. A type of the memory and a manner of disposing the memory and the processor are not limited in this embodiment of this application.

According to a thirteenth aspect, an information sending apparatus is provided, where the apparatus includes a transceiver and a processor.

The processor is configured to invoke, from a memory, instructions stored in the memory and run the instructions, to generate a PPDU, where the PPDU includes a target long training field, the target long training field includes a long training sequence of the PPDU, a modulation scheme of a first symbol following the target long training field is quadrature binary phase shift keying (QBPSK), the first symbol includes feature information, and the feature information is used to indicate that a PPDU format is a preset format.

The processor is further configured to control the transceiver to send the PPDU.

In a possible implementation, the information sending apparatus further includes a memory, and the memory is configured to store instructions.

In a possible implementation, the memory may be integrated with the processor, or the memory and the processor are disposed separately.

In a specific implementation process, the memory may be a non-transitory memory, for example, a read-only memory. The memory and the processor may be integrated on a same chip, or may be separately disposed on different chips. A type of the memory and a manner of disposing the memory and the processor are not limited in this embodiment of this application.

According to a fourteenth aspect, an information receiving apparatus is provided, where the apparatus includes a transceiver and a processor.

The processor is configured to invoke, from a memory, instructions stored in the memory and run the instructions, to control the transceiver to receive a data unit.

The processor is further configured to: when a modulation scheme of a first symbol following the target long training field of the data unit is QBPSK, and a second symbol following the target long training field meets a third condition, determine that a PPDU format is a preset format, where the target long training field includes a long training sequence.

In a possible implementation, the information receiving apparatus further includes a memory, and the memory is configured to store instructions.

In a possible implementation, the memory may be integrated with the processor, or the memory and the processor are disposed separately.

In a specific implementation process, the memory may be a non-transitory memory, for example, a read-only memory. The memory and the processor may be integrated on a same chip, or may be separately disposed on different chips. A type of the memory and a manner of disposing the memory and the processor are not limited in this embodiment of this application.

In a possible implementation, the feature information is carried in a signature field of the first symbol, and the signature field is a field at a preset position in the first symbol.

In a possible implementation, the PPDU includes a legacy short training field.

The third condition is that the second symbol is the same as the first symbol; or the third condition is that content of the second symbol is the same as content of the first symbol, a modulation scheme of the second symbol is the same as the modulation scheme of the first symbol, and an interleaver used for the second symbol is different from an interleaver used for the first symbol; or the third condition is that content of the second symbol is the same as content of the first symbol, a modulation scheme of the second symbol is the same as the modulation scheme of the first symbol, the first symbol has been interleaved, and the second symbol has not been interleaved; or the third condition is that a modulation scheme of the second symbol is binary phase shift keying BPSK.

According to a fifteenth aspect, an information transmission system is provided. The system includes an information sending apparatus configured to implement the method in the foregoing aspects or any possible implementation of the foregoing aspects, and an information receiving apparatus configured to implement the method in the foregoing aspects or any possible implementation of the foregoing aspects.

According to a sixteenth aspect, a computer program product is provided, where the computer program product includes computer program code, and when the computer program code is run by a computer, the computer is enabled to perform at least one of the information sending method and the information receiving method in the foregoing aspects.

According to a seventeenth aspect, a computer-readable medium is provided, configured to store a computer program, where the computer program includes instructions used to perform at least one of the information sending method and the information receiving method in the foregoing aspects.

According to an eighteenth aspect, a chip is provided, including a processor, configured to invoke, from a memory, instructions stored in the memory and run the instructions, so that a device on which the chip is installed performs at least one of the information sending method and the information receiving method in the foregoing aspects.

According to a nineteenth aspect, another chip is provided, including an input interface, an output interface, a processor, and a memory, where the input interface, the output interface, the processor, and the memory are connected through an internal connection path, the processor is configured to execute code in the memory, and when the code is executed, the processor is configured to perform at least one of the information sending method and the information receiving method in the foregoing aspects.

BRIEF DESCRIPTION OF DRAWINGS

FIG. 4 is a schematic diagram of a PPDU format according to an embodiment of this application;

FIG. 5 is a schematic diagram of a PPDU format according to an embodiment of this application;

FIG. 10 is a schematic diagram of a PPDU format according to an embodiment of this application;

FIG. 13 is a schematic diagram of a PPDU format according to an embodiment of this application;

DESCRIPTION OF EMBODIMENTS

To make the objectives, technical solutions, and advantages of this application clearer, the following further describes the implementations of this application in detail with reference to the accompanying drawings.

Figure 1:
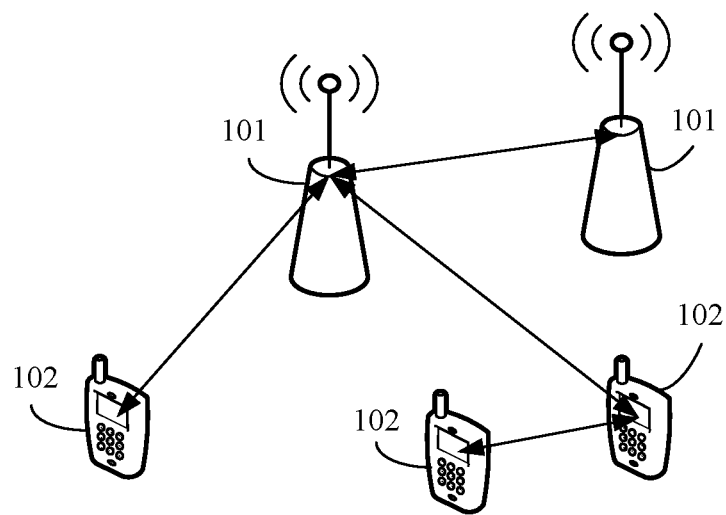
FIG. 1 is an architectural diagram of an implementation environment according to an embodiment of this application.

FIG. 1 is an architectural diagram of an implementation environment according to an embodiment of this application. The implementation environment may include one or more access points (English full name: access point, English abbreviation: AP) 101 and one or more stations (English full name: station, English abbreviation: STA) 102. The access point 101 may be an information sending apparatus or information receiving apparatus provided in the following embodiment, and the station 102 may also be an information sending apparatus or information receiving apparatus provided in the following embodiment. The implementation environment may be an environment in which backward compatibility is not considered. In an exemplary scenario, there may be no conventional device in the implementation environment. For example, the implementation environment is inside an enterprise or a campus. In another example, the implementation environment is an exclusive villa. In another exemplary scenario, an operating band of each device in the implementation environment may be different from that of a conventional device.

Figure 2:
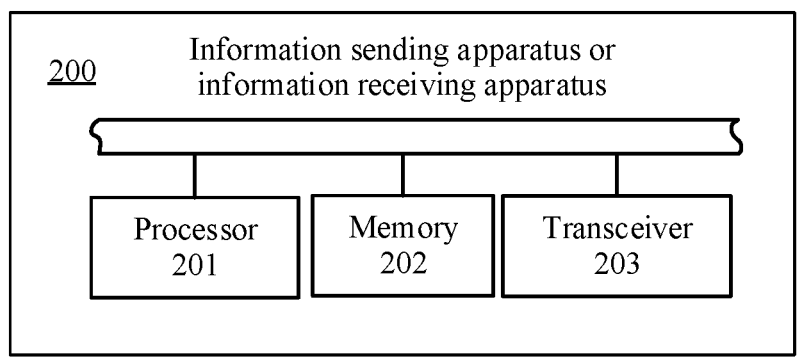
FIG. 2 is a schematic structural diagram of an information sending apparatus or information receiving apparatus according to an embodiment of this application.

FIG. 2 is a schematic structural diagram of an information sending apparatus or information receiving apparatus according to an embodiment of this application. The information sending apparatus or information receiving apparatus 200 may have relatively large differences due to different configurations or performance, and may include a processor (English full name: central processing units, English abbreviation: CPU) 201, a memory 202, and a transceiver 203. The memory 202 stores instructions, and the processor 201 is configured to invoke, from the memory 202, the instructions stored in the memory 202 and run the instructions, to perform any one of step 301, step 304, step 801, step 804, step 1101, and step 1104 in an information sending method and information receiving method provided in the following embodiments. The processor is further configured to control the transceiver 203 to perform at least one of step 302, step 303, step 802, step 803, step 1102, and step 1103 in the following embodiments. The processor 201, the memory 202, and the transceiver 203 may be connected by using a bus, and can perform communication by using the bus. Certainly, the information sending apparatus or information receiving apparatus 200 may further include other components configured to implement device functions. Details are not described herein again.

Figure 3:
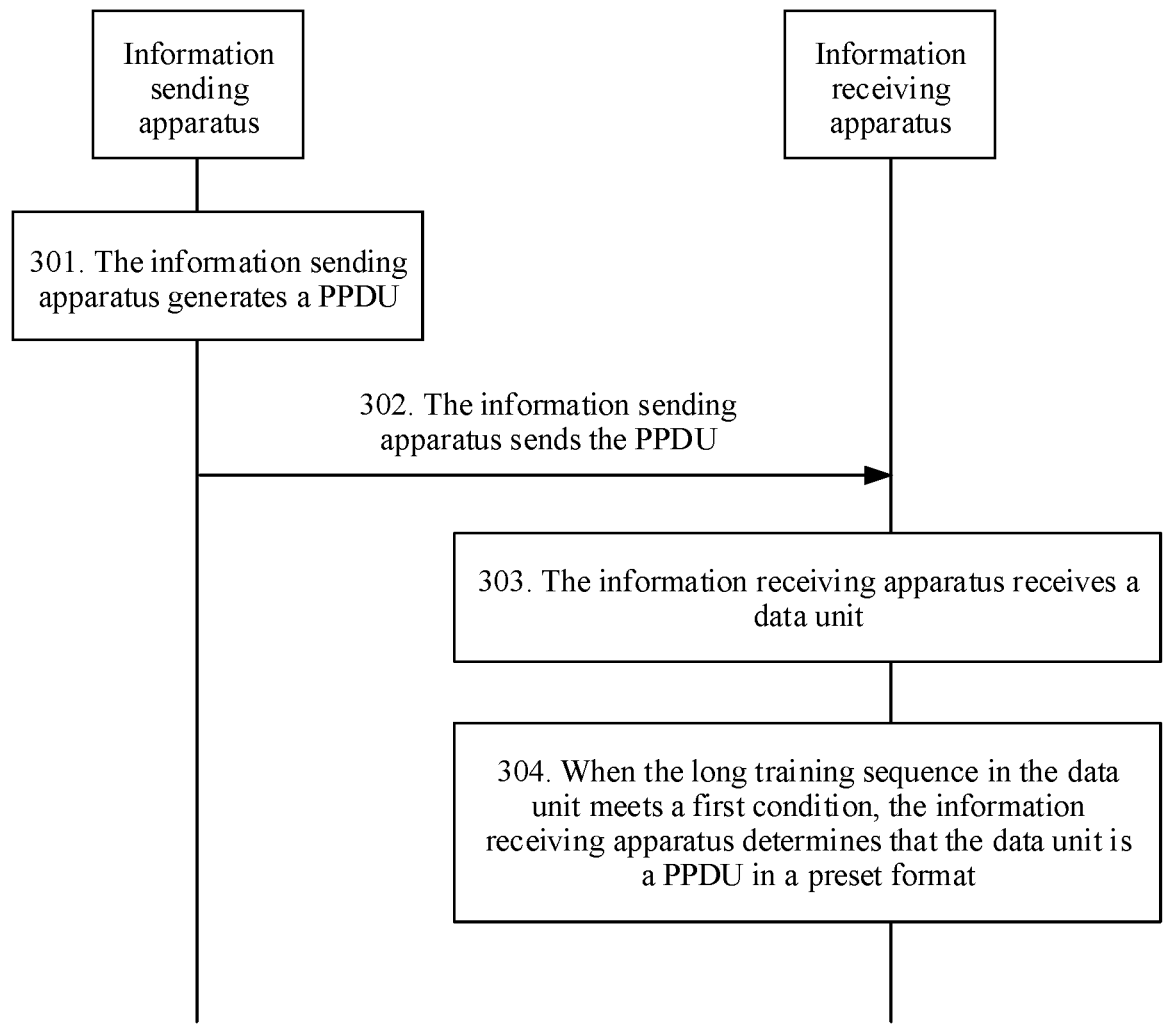
FIG. 3 is a flowchart of an information transmission example according to an embodiment of this application.

FIG. 3 is a flowchart of an information transmission example according to an embodiment of this application. The information transmission example includes an information sending method performed by an information sending apparatus and an information receiving method performed by an information receiving apparatus. As shown in FIG. 3, the method includes the following step 301 to step 304.

301. The information sending apparatus generates a PPDU.

Refer to FIG. 4. The PPDU may include a target short training field, a target long training field, a target signaling field, and a data field. The target short training field, the target long training field, and the target signaling field may be located at a header of the PPDU, and the data field may be located after the target signaling field. In a possible implementation, the target short training field may be a first field of the PPDU, the target long training field may be a second field of the PPDU, and the target signaling field may be the third field of the PPDU. In FIG. 4, M represents the number of symbols of the target signaling field, and M is a positive integer. It should be noted that, the PPDU provided in this embodiment may include a field not shown in FIG. 4. Details are not described herein again.

It should be noted that, in order to distinctively describe a preamble portion of a PPDU in a non-HT format, each field of the preamble portion of the PPDU provided in this embodiment is prefixed with "target". A field in which a short training sequence in the preamble portion is located is referred to as a target short training field, a field in which a long training sequence in the preamble portion is located is referred to as a target long training field, and a field in which a transmission rate and a length of the preamble portion are located is referred to as a target signaling field. "Target" is only a prefix used to distinguish between descriptions, and the word "target" may be replaced with a prefix of a field in a preamble portion of any generation WLAN standard after 802.11ax. For example, "target" can be replaced with extremely high throughput greenfield (English full name: extremely high throughput greenfield, English abbreviation: GF-EHT), extremely high throughput (English full name: extremely high throughput, English abbreviation: EHT), extreme throughput (English full name: extreme throughput, English abbreviation: XT), ultra high throughput (English full name: ultra high throughput, English abbreviation: UHT), or the like. For example, "target" is replaced with GF-EHT. The target short training field may be referred to as GF-EHT STF, the target long training field may be referred to as GF-EHT LTF, and the target signaling field may be referred to as GF-EHT SIG. In another example, "target" may be replaced with legacy (English full name: legacy, English abbreviation: L). In this case, the target short training field may be referred to as L-STF, and the target signaling field may be referred to as L-SIG. Certainly, the word "target" may be replaced with another word based on a specific WLAN standard. Examples of possible terms are not provided herein.

For example, "target" is replaced with "GF-EHT". Refer to FIG. 5. The PPDU may include GF-EHT STF, GF-EHT LTF, GF-EHT SIG, and a data field. In FIG. 5, EHT-SIG-AO represents a first symbol in EHT-SIG, and EHT-SIG-A1-M represents a second symbol in EHT-SIG to an $M^{th}$ symbol in EHT-SIG, where M is a positive integer. GF-EHT LTF in FIG. 5 includes two parts. A part of GF-EHT LTF is located before GF-EHT SIG, and is used to detect a PPDU format on the basis of channel estimation. The target long training sequence is in this part of GF-EHT LTF. The other part of the GF-EHT LTF is located after GF-EHT SIG, and the other part includes N symbols used for channel estimation, where N is a positive integer.

Target short training field: a field in which the short training sequence is located. The target short training field may include two symbols. For example, the target short training field may include a first symbol and a second symbol in the PPDU, where the symbol may be an orthogonal frequency division multiplexing (English full name: Quadrature frequency division multiplexing, English abbreviation: OFDM) symbol. Duration of the target short training field may be 8 microseconds (English: microsecond, µs for short). The target short training field may belong to a preamble portion of the PPDU. The target short training field may be a first field of the PPDU. The target short training field may be used by the information receiving apparatus to discover the PPDU. Specifically, functions of the target short training field may include automatic gain control (English full name: automatic gain control, English abbreviation: AGC), diversity selection, timing capture, receiver coarse frequency capture, and the like.

Short training sequence: also referred to as an $S_k$ sequence, where k is a length of the sequence, and k is a positive integer. The short training sequence may be a short training sequence included in a legacy short training field (English full name: legacy short training field, English abbreviation: L-STF), namely, an L-STF sequence. The information sending apparatus may prestore the short training sequence, to generate a signal of the target short training field based on the short training sequence, and send the signal of the target short training field. The short training sequence may include a plurality of values, and each value may be 1, −1, 0, (1+j), (−1−j), or the like.

If a bandwidth is 20 MHz, the L-STF sequence may be shown in the following formula (1):

In a possible implementation, a formula of the signal of the target short training field may be the following formula (2):

$$r_{EHT-GF-LTF}^{(i_{TX})}(t) = \frac{1}{\sqrt{N_{STS} \cdot N_{EHT-GF-LTF}^{Tone}}} \qquad (2)$$

$$w_{T_{EHT-GF-LTF}}(t) * \sum_{k=-N_{SR}}^{N_{SR}} \sum_{i_{STS}=1}^{N_{STS}} [Q_k]_{i_{TX},i_{STS}} [P_{EHT-LTF}]_{i_{STS},1}$$

$$\gamma_k L_k \exp(j2\pi k \Delta_F (t - T_{GI} - T_{CS}^{i_{STS}}));$$

$r_{EHT-GF-STF}$ represents the signal, t represents time, $i_{TX}$ represents an index of an antenna and is a positive integer greater than or equal to 1, STS represents a space-time stream, * represents multiplication, $N_{STS}$ represents a number of space-time streams, $N_{EHT-GF-STF}$ represents a number of subcarriers with energy in the target short training field; $W_{T_{EHT-GF-STF}}(t)$ represents a window function of the target short training field, $N_{SR}$ represents an index of a highest data subcarrier among all data subcarriers of the target short training field, exp( ) represents obtaining an exponent, $T_{CS}^{i_{STS}}$ represents duration of a circular shift, $\gamma_k$ represents a phase rotation factor, $P_{EHT-LTF}$ represents a mapping matrix of the target short training field, $Q_k$ represents a precoding matrix of a $k^{th}$ subcarrier, and $\Delta_F$ represents a subcarrier spacing of the target short training field.

Target long training field: The target long training field includes a long training sequence. The long training sequence is also referred to as an $L_k$ sequence, where k is a sequence length, and k is a positive integer. The long training sequence in the embodiment of FIG. 3 is a target long training sequence. The target long training field may $$S_{-26,26} = \qquad (1)$$

$$\sqrt{1/2} \left\{ \begin{array}{l} 0, 0, 1+j, 0, 0, 0, -1, -j, 0, 0, 0, 1+j, 0, 0, 0, -1-j, 0, 0, 0, 1+j, 0, 0, 0, 0, 0, 0, \\ -1-j, 0, 0, 0, -1-j, 0, 0, 0, 1+j, 0, 0, 0, 1+j, 0, 0, 0, 1+j, 0, 0, 0, 1+j, 0, 0 \end{array} \right\};$$

If the bandwidth is 40 MHz or another bandwidth, phase rotation and shift may be performed on the basis of the foregoing formula (1), to obtain an L-STF sequence at another bandwidth. Details are not described herein.

A length of the short training sequence may be an integer multiple of 64. Specifically, if the bandwidth is 20 MHz, the length of the short training sequence may be 64; and if the bandwidth is greater than 20 MHz, the length of the short training sequence may be a ratio of the bandwidth to 20 MHz. A periodicity of the short training sequence may be 0.8 µs, and the short training sequence may have 10 periodicities.

For a manner of generating a signal by using a short training sequence, in a possible implementation, the short training sequence may be carried on a plurality of subcarriers of a target short training field, to obtain a frequency domain signal; inverse Fourier transform is performed on the frequency domain signal to obtain a time domain signal; and the time domain signal is sent by using a transceiver. Certainly, a process of generating a signal by using a short training sequence may include phase rotation, inserting a guard interval, performing windowing processing by using a window function, applying a cyclic shift, and the like. Details are not described herein.

include two symbols. For example, the target long training field may include the third symbol and the fourth symbol in the PPDU. The symbol may be an OFDM symbol. Duration of the target long training field may be 8 µs. The target long training field may belong to a preamble portion of the PPDU. The target long training field may be a second field of the PPDU. The target long training field may be referred to as GF-EHT-LTF. The target long training field may be used by the information receiving apparatus to detect a PPDU format. In addition, functions of the target long training field may further include channel estimation, receiver accurate frequency capture, and the like. Details are not described herein.

Target long training sequence: The target long training sequence is orthogonal to a legacy long training sequence or a high throughput long training sequence. The information sending apparatus may prestore the target long training sequence, to generate a signal of the target long training field based on the target long training sequence, and send the signal of the target long training field. The target long training sequence may include a plurality of values, and each value may be 1, −1, or 0. A length of the target long training sequence may be an integer multiple of 64. The length of the target long training sequence may refer to the number of values in the target long training sequence. Specifically, if the bandwidth is 20 MHz, the length of the target long training sequence may be 64; and if the bandwidth is greater than 20 MHz, the length of the target long training sequence may be 64*(bandwidth/20 MHz), where "*" represents a product, and "/" represents a division operation. A periodicity of the target long training sequence may be 3.2 µs, and the target long training sequence may have two periodicities.

The legacy long training sequence may be a long training sequence included in a legacy long training field (English full name: legacy long training field, English abbreviation: L-LTF), namely, an L-LTF sequence. The legacy long training sequence may include a plurality of values, and each value may be 1, −1, or 0. A length of the legacy long training sequence may be an integer multiple of 64. The length of the legacy long training sequence may refer to the number of values in the legacy long training sequence.

If the bandwidth is equal to 20 MHz, an expression of the legacy long training sequence may be the following formula (3):

$$\text{L-LTF}_{64} = [0\ 0\ 0\ 0\ 0\ 0\ 1\ 1\ -1\ -1\ 1\ 1\ -1\ 1\ -1\ 1\ 1\ 1 \\ 1\ 1\ 1\ -1\ -1\ 1\ 1\ -1\ 1\ -1\ 1\ 1\ 1\ 1\ 1\ 0,\ 1\ -1\ -1\ 1\ 1 \\ 1\ -1\ 1\ -1\ 1\ -1\ -1\ -1\ -1\ -1\ 1\ 1\ -1\ -1\ 1\ 1\ -1\ 1 \\ 1\ 1\ 1\ 1\ 1\ 0\ 0\ 0\ 0\ 0]; \quad (3)$$

$\text{L-LTF}_{64}$ represents a legacy long training sequence whose length is 64.

It should be noted that, the foregoing formula (3) is described by using an example in which the bandwidth is 20 MHz. If the bandwidth is not 20 MHz, on the basis of the foregoing formula (3), the foregoing formula (3) may be shifted based on the bandwidth, to obtain a legacy long training sequences at another bandwidth. In addition, the foregoing formula (3) may be filled in based on a requirement, and a sequence obtained after the filling in is used as the legacy long training sequence.

The high throughput long training sequence may be a long training sequence included in a high throughput long training field (English full name: high throughput long training field, English abbreviation: HT-LTF), namely, an HT-LTF sequence. The high throughput long training sequence may include a plurality of values, and each value may be 1, −1, or 0. A length of the high throughput long training sequence may be an integer multiple of 64. The length of the high throughput long training sequence may refer to the number of values in the high throughput long training sequence.

If the bandwidth is equal to 20 MHz, an expression of the high throughput long training sequence may be the following formula (4):

$$\text{HT-LTF}_{64} = [0\ 0\ 0\ 0\ 1\ 1\ 1\ 1\ -1\ -1\ 1\ 1\ -1\ 1\ -1\ 1\ 1\ 1 \\ 1\ 1\ 1\ -1\ -1\ 1\ 1\ -1\ 1\ -1\ 1\ 1\ 1\ 1\ 1\ 0,\ 1\ -1\ -1\ 1\ 1 \\ 1\ -1\ 1\ -1\ 1\ -1\ -1\ -1\ -1\ -1\ 1\ 1\ -1\ -1\ 1\ 1\ -1\ 1 \\ 1\ 1\ 1\ 1\ -1\ -1\ 0\ 0\ 0]; \quad (4)$$

$\text{HT-LTF}_{64}$ represents a high throughput long training sequence whose length is 64.

It should be noted that, the foregoing formula (4) is described by using an example in which the bandwidth is 20 MHz. If the bandwidth is not 20 MHz, on the basis of the foregoing formula (4), the foregoing formula (4) may be shifted based on the bandwidth, to obtain a high throughput long training sequence at another bandwidth. In addition, the foregoing formula (4) may be filled in based on a requirement, and a sequence obtained after the filling in is used as the high throughput long training sequence.

It should be noted that, the target long training sequence being orthogonal to the legacy long training sequence or the high throughput long training sequence may mean that the target long training sequence is strictly orthogonal to the legacy long training sequence or the high throughput long training sequence, or may mean that the target long training sequence is quasi-orthogonal to the legacy long training sequence or the high throughput long training sequence. The target long training sequence being strictly orthogonal to the legacy long training sequence or the high throughput long training sequence means that a cross-correlation result between the target long training sequence and the legacy long training sequence or the high throughput long training sequence is 0. The target long training sequence being quasi orthogonal to the legacy long training sequence or the high throughput long training sequence means that a cross-correlation result between the target long training sequence and the legacy long training sequence or the high throughput long training sequence is less than a preset threshold. The preset threshold may be a value close to 0. For example, the preset threshold may be 0.1.

In a possible implementation, the target long training sequence may be obtained by splicing at least two $P_{32}$ sequences.

Specifically, the target long training sequence may be a linear combination of at least two $P_{32}$ sequences, and a coefficient of each $P_{32}$ sequence may be 1 or −1. The number of $P_{32}$ sequences in the target long training sequence may be determined based on a bandwidth of the PPDU. For example, if the bandwidth is 20 MHz, the target long training sequence may be a linear combination of two $P_{32}$ sequences; and if the bandwidth is (20*N) MHz, the target long training sequence may be a linear combination of (2*N) $P_{32}$ sequences. N is a positive integer greater than 1.

The $P_{32}$ sequence may be orthogonal to an upper part of the legacy long training sequence or the high throughput long training sequence, and the $P_{32}$ sequence may be orthogonal to a lower part of the legacy long training sequence or the high throughput long training sequence. A length of the $P_{32}$ sequence is 32, namely, 32 values are included. An expression of the $P_{32}$ sequence may be the following formula (5).

$$p_{32} = [0\ 0\ 0\ 1\ -1\ 1\ -1\ -1\ 1\ -1\ 1\ 1\ -1\ 1\ 1\ 1\ 0\ -1\ -1 \\ -1\ 1\ -1\ -1\ -1\ 1\ -1\ 1\ 1\ 1\ -1\ 0\ 0]; \quad (5)$$

Each value in the $P_{32}$ sequence may correspond to one sequence number, and the sequence number is used to identify a corresponding value. For example, $P_{32}(M)$ may represent a value whose sequence number is M in the $P_{32}$ sequence, and $P_{32}(M:N)$ may represent a value whose sequence number is M to a value whose sequence number is N in the $P_{32}$ sequence, where M and N are integers, and M is less than N. For example, sequence numbers of all values in the $P_{32}$ sequence may be −16, −15, . . . , 0, 1, 2, . . . , 15 sequentially. In this example, the sequence number of the first value from the left of the $P_{32}$ sequence may be −16, the sequence number of the second value from the left of the $P_{32}$ sequence may be −15, and the sequence number of the third value from the left of the $P_{32}$ sequence may be −14. By analogy, the sequence number of the value in the middle of the $P_{32}$ sequence may be 0, the sequence number of the first value from the right of the value in the middle of the $P_{32}$ sequence may be 1, the sequence number of the first value from the right of the value in the middle of the $P_{32}$ sequence may be 1, and the sequence number of the first value from the right of the $P_{32}$ sequence may be −16.

Optionally, one or more positions in one or more $P_{32}$ sequences in the target long training sequence may have been filled in. The filling in means replacing a value of 0 in the $P_{32}$ sequence with 1 or −1.

Figure 6:
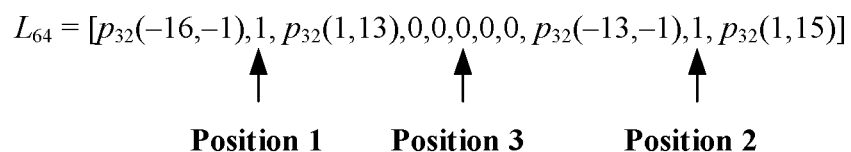
FIG. 6 is a schematic diagram of a target long training sequence according to an embodiment of this application.

In a possible implementation, an intermediate position of the $P_{32}$ sequence in the target long training sequence may have been filled in. The intermediate position may be denoted as $P_{32}(0)$. For example, if the target long training sequence is a linear combination of two $P_{32}$ sequences, the intermediate position of the $P_{32}$ sequence is filled in by using 1. An expression of the target long training sequence may be shown in FIG. 6. In FIG. 6, position 1 and position 2 are positions that have been filled in.

An effect achieved by filling in the intermediate position of the $P_{32}$ sequence may include at least: The intermediate position of the $P_{32}$ sequence is originally a position corresponding to a direct current component at a bandwidth of 1 MHz, and the intermediate position of the $P_{32}$ sequence is originally set to 0 to remove a direct current component in a spectrum. However, when the target long training sequence is constructed, the position corresponding to the direct current component has been switched from the intermediate position of the $P_{32}$ sequence to another position. For example, in FIG. 6, the position corresponding to the direct current component has been switched from position 1 and position 2 to position 3, and after the position corresponding to the direct current component has been switched, if the intermediate position of the $P_{32}$ sequence is still set to 0, a waste of spectrum resources is caused. By filling in the intermediate position of the $P_{32}$ sequence, a subcarrier at the intermediate position of the $P_{32}$ sequence may be used, thereby saving spectrum resources. For example, in FIG. 6, values corresponding to position 1 and position 2 are set from 0 to 1, to fill in position 1 and position 2, and two subcarriers corresponding to position 1 and position 2 may be used, thereby saving spectrum resources of the two subcarriers.

Figure 7:
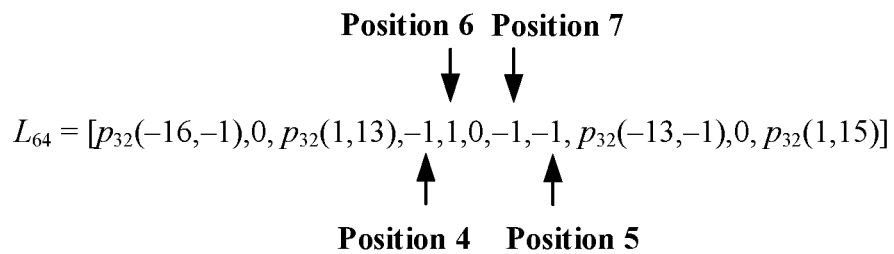
FIG. 7 is a schematic diagram of a target long training sequence according to an embodiment of this application.

In a possible implementation, an edge position of the $P_{32}$ sequence in the target long training sequence may have been filled in. The edge position may be any one or a combination of $P_{32}(-15)$, $P_{32}(-14)$, $P_{32}(14)$, and $P_{32}(15)$. For example, if the target long training sequence is a linear combination of two $P_{32}$ sequences, $P_{32}(14)$ and $P_{32}(-14)$ are filled in by using $-1$, and $P_{32}(15)$ and $P_{32}(-15)$ are filled in by using 1. An expression of the target long training sequence may be shown in FIG. 7. Position 4 in FIG. 7 is $P_{32}(14)$ that has been filled in, position 5 in FIG. 7 is $P_{32}(-14)$ that has been filled in, position 6 in FIG. 7 is $P_{32}(15)$ that has been filled in, and position 7 in FIG. 7 is $P_{32}(-15)$ that has been filled.

An effect achieved by filling in the edge position of the $P_{32}$ sequence may include at least: The edge position of the $P_{32}$ sequence is originally a position corresponding to an edge subcarrier at a bandwidth of 1 MHz, and the edge position of the $P_{32}$ sequence is originally set to 0 to avoid adjacent band interference. However, when the target long training sequence is constructed, a part of the edge position of the $P_{32}$ sequence has been switched from a position corresponding to the edge subcarrier to positions at the left and right of the intermediate position of the target long training sequence. For example, in FIG. 7, for position 4 and position 6, the two positions are originally two positions at the right edge of the $P_{32}$ sequence, but when the target long training sequence is constructed, the two positions are switched to two positions at the left of the intermediate position of the target long training sequence. For position 7 and position 5, the two positions are originally two positions at the left edge of the $P_{32}$ sequence, but when the target long training sequence is constructed, the two positions are switched to two positions at the right of the intermediate position of the target long training sequence. In this case, if the edge position of the $P_{32}$ sequence is still set to 0, a spectrum waste is caused. However, by filling in the edge position of the $P_{32}$ sequence, a subcarrier at the edge position of the $P_{32}$ sequence may be used, thereby saving spectrum resources. For example, in FIG. 7, the values corresponding to position 4, position 5, and position 7 are set from 0 to $-1$ and the value corresponding to position 6 is set from 0 to 1, so that position 4, position 5, position 6, and position 7 are filled in. The four subcarriers corresponding to position 4, position 5, position 6, and position 7 may be used, thereby saving spectrum resources of the four subcarriers.

In a possible implementation, if the bandwidth is equal to 20 MHz, an expression of the target long training sequence may be any one of the following formulas (6) to (18):

$$L_{64}=[p_{32},p_{32}]; \tag{6}$$

$$L_{64}=[p_{32},-p_{32}]; \tag{7}$$

$$L_{64}=[-p_{32},p_{32}]; \tag{8}$$

$$L_{64}=[-p_{32},-p_{32}]; \tag{9}$$

$$L_{64}=[p_{32}(-16,-1),x1,p_{32}(1,13),-1,1,0,-1,-1,p_{32}(-13,-1),x2,p_{32}(1,15)]; \tag{10}$$

$$L_{64}=[p_{32}(-16,-1),x1,p_{32}(1,13),1,-1,0,1,1,p_{32}(-13,-1),x2,p_{32}(1,15)]; \tag{11}$$

$$L_{64}=[p_{32}(-16,-1),x1,p_{32}(1,13),1,1,p_{32}(-13,-1),x2,p_{32}(1,15)]; \tag{12}$$

$$L_{64}=[p_{32}(-16,-1),0,p_{32}(1,13),1,1,0,-1,-1,p_{32}(-13,-1),0,p_{32}(1,15)]; \tag{13}$$

$$L_{64}=[p_{32}(-16,-1),1,p_{32}(1,13),0,0,0,0,0,p_{32}(-13,-1),1,p_{32}(1,15)]; \tag{14}$$

$$L_{64}=[p_{32}(-16,-1),0,p_{32}(1,13),-1,1,0,-1,-1,p_{32}(-13,-1),0,p_{32}(1,15)]; \tag{15}$$

$$L_{64}=[p_{32}(-16,-1),0,p_{32}(1,13),1,-1,0,1,1,p_{32}(-13,-1),0,p_{32}(1,15)]; \tag{16}$$

$$L_{64}=[p_{32}(-16,-1),0,p_{32}(1,13),1,-1,0,1,-1,p_{32}(-13,-1),0,p_{32}(1,15)]; \tag{17 and}$$

$$L_{64}=[p_{32}(-16,-1),0,p_{32}(1,13),1,1,0,-1,-1,p_{32}(-13,-1),0,p_{32}(1,15)]; \tag{18}$$

$L_{64}$ represents a target long training sequence whose length is 64, x1 is $-1$ or 1, x2 is $-1$, $p_{32}(-16,-1)$ represents a sequence that is from a value whose sequence number is $-16$ in $p_{32}$ to a value whose sequence number is $-1$ in $p_{32}$, $p_{32}(1,13)$ represents a sequence that is from a value whose sequence number is 1 in $p_{32}$ to a value whose sequence number is 13 in $p_{32}$, $p_{32}(-13, -1)$ represents a sequence that is from a value whose sequence number is $-13$ in $p_{32}$ to a value whose sequence number is $-1$ in $p_{32}$, and $p_{32}(1, 15)$ represents a sequence that is from a value whose sequence number is 1 in $p_{32}$ to a value whose sequence number is 15 in $p_{32}$.

It should be noted that, $-p_{32}$ represents flipping each value in the $p_{32}$ sequence. For example, for a value whose sequence number in the $p_{32}$ sequence is M, if $p_{32}(M)$ is 1, $-p_{32}(M)$ is $-1$; if $p_{32}(M)$ is $-1$, $-p_{32}(M)$ is 1; and if $p_{32}(M)$ is 0, $-p_{32}(M)$ is 0. M is an integer, a minimum value of M may be $-16$, and a maximum value of M may be 15.

It should be noted that, the foregoing formulas (6) to (18) are described by using an example in which the bandwidth is 20 MHz. If the bandwidth is not 20 MHz, on the basis of the foregoing formulas (6) to (18), the foregoing formulas (6) to (18) may be shifted based on the bandwidth, to obtain a target long training sequence at another bandwidth. In addition, the foregoing formulas (6) to (18) may be filled in based on a requirement, and a sequence obtained after the filling in is used as the target long training sequence.

In a possible implementation, if the bandwidth is greater than 20 MHz, an expression of the target long training sequence may be the following formula (19):

$$L_k=[a_1 L_{64}, a_2 L_{64}, \ldots a_k L_{64}]; \tag{19}$$

$$L_{64}=[p_{32}, p_{32}]; \tag{6}$$

$$L_{64}=[p_{32}, -p_{32}]; \tag{7}$$

$$L_{64}=[-p_{32}, p_{32}]; \tag{8}$$

$$L_{64}=[-p_{32}, -p_{32}]; \tag{9}$$

$$L_{64}=[p_{32}(-16,-1), x1, p_{32}(1,13), -1, 1, 0, -1, -1, p_{32}(-13,-1), x2, p_{32}(1,15)]; \tag{10}$$

$$L_{64}=[p_{32}(-16,-1), x1, p_{32}(1,13), 1, -1, 0, 1, 1, p_{32}(-13,-1), x2, p_{32}(1,15)]; \tag{11}$$

$$L_{64}=[p_{32}(-16,-1), x1, p_{32}(1,13), 1, -1, 0, -1, -1, p_{32}(-13,-1), x2, p_{32}(1,15)]; \tag{12}$$

$$L_{64}=[p_{32}(-16,-1), 0, p_{32}(1,13), 1, 1, 0, -1, -1, p_{32}(-13,-1), 0, p_{32}(1,15)]; \tag{13}$$

$$L_{64}=[p_{32}(-16,-1), 1, p_{32}(1,13), 0, 0, 0, 0, 0, p_{32}(-13,-1), 1, p_{32}(1,15)]; \tag{14}$$

$$L_{64}=[p_{32}(-16,-1), 0, p_{32}(1,13), -1, 1, 0, -1, -1, p_{32}(-13,-1), 0, p_{32}(1,15)]; \tag{15}$$

$$L_{64}=[p_{32}(-16,-1), 0, p_{32}(1,13), 1, -1, 0, 1, 1, p_{32}(-13,-1), 0, p_{32}(1,15)]; \tag{16}$$

$$L_{64}=[p_{32}(-16,-1), 0, p_{32}(1,13), 1, -1, 0, 1, -1, p_{32}(-13,-1), 0, p_{32}(1,15)]; \tag{17 and}$$

$$L_{64}=[p_{32}(-16,-1), 0, p_{32}(1,13), 1, 1, 0, -1, -1, p_{32}(-13,-1), 0, p_{32}(1,15)]; \tag{18}$$

$L_k$ represents a target long training sequence, k represents a length of the target long training sequence, k is a ratio of a bandwidth of a PPDU to 20 MHz, and k is a positive integer greater than or equal to 3, $a_1$, $a_2$, and $a_k$ are −1 or 1, $L_{64}$ represents a target long training sequence whose length is 64, x1 is −1 or 1, x2 is −1, $p_{32}(-16,-1)$ represents a sequence that is from a value whose sequence number is −16 in $p_{32}$ to a value whose sequence number is −1 in $p_{32}$, $p_{32}(1,13)$ represents a sequence that is from a value whose sequence number is 1 in $p_{32}$ to a value whose sequence number is 13 in $p_{32}$, $p_{32}(-13,-1)$ represents a sequence that is from a value whose sequence number is −13 in $p_{32}$ to a value whose sequence number is −1 in $p_{32}$, and $p_{32}(1, 15)$ represents a sequence that is from a value whose sequence number is 1 in $p_{32}$ to a value whose sequence number is 15 in $p_{32}$, and $p_{32}$=[0 0 0 1 −1 1 −1 −1 1 −1 1 1 −1 1 1 1 0 −1 −1 −1 1 −1 −1 −1 1 −1 1 1 1 −1 0 0].

For a manner of generating a signal by using a target long training sequence, in a possible implementation, the target long training sequence may be carried on a plurality of subcarriers of the target long training field, to obtain a frequency domain signal; inverse Fourier transform is performed on the frequency domain signal to obtain a time domain signal; and the time domain signal is sent by using a transceiver.

Specifically, for each value in the target long training sequence, the value may be carried on one subcarrier. For example, a value whose sequence number is k in the target long training sequence may be carried on a subcarrier whose sequence number is k, where k is an integer. If any value in the target long training sequence is 0, after the value is carried on a subcarrier, the subcarrier is an empty subcarrier.

For example, an expression of the target long training sequence may be $L_{64}$=[$p_{32}(-16,-1)$, x1, $p_{32}(1,13)$, −1, 1, 0, −1, −1, $p_{32}(-13, -1)$, x2, $p_{32}(1, 15)$], and the target long training sequence may be carried by 64 subcarriers. For example, sequence numbers of the 64 subcarriers are −32 to 31 respectively. A value whose sequence number is −16 to a value whose sequence number is −1 in the $p_{32}$ sequence may be respectively carried on a subcarrier from whose sequence number is −32 to a subcarrier whose sequence number is −15, x1 may be carried on a subcarrier whose sequence number is −14, a value whose sequence number 1 to a value whose sequence number is 13 in the $p_{32}$ sequence are respectively carried on a subcarrier whose sequence number is −13 to a subcarrier whose sequence number is −1, 0 may be carried on a subcarrier whose sequence number is 0, −1 may be carried on a subcarrier whose sequence number is 1, and −1 may be carried on a subcarrier whose sequence number is 2, a value whose sequence number is −13 to a value whose sequence number is −1 in the $p_{32}$ sequence may be respectively carried on a subcarrier whose sequence number is 3 to a subcarrier whose sequence number is 15, x2 may be carried on a subcarrier whose sequence number is 16, and a value whose sequence number is 1 to a value whose sequence number is 15 in the $p_{32}$ sequence may be respectively carried on a subcarrier whose sequence number is 17 to a subcarrier whose sequence number is 31.

Certainly, a process of generating a signal by using a target long training sequence may include phase rotation, inserting a guard interval, performing windowing processing by using a window function, applying a cyclic shift, and the like. Details are not described herein.

In a possible implementation, a formula of the signal of the target long training field may be the following formula (20):

$$r^{(i_{TX})}_{EHT-GF-LTF}(t) = \frac{1}{\sqrt{N_{STS} \cdot N^{Tone}_{EHT-GF-LTF}}} \tag{20}$$

$$wT_{EHT-GF-LTF}(t) * \sum_{k=-N_{SR}}^{N_{SR}} \sum_{i_{STS}=1}^{N_{STS}} [Q_k]_{i_{TX}, i_{STS}} [P_{EHT-LTF}]_{i_{STS},1}$$

$$\gamma_k L_k \exp(j 2\pi k \Delta_F (t - T_{GI} - T^{i_{STS}}_{CS}));$$

$r_{EHT-GF-LTF}$ represents the signal, t represents time, $i_{TX}$ represents an index of an antenna and is a positive integer greater than or equal to 1, STS represents a space-time stream, * represents multiplication, $N_{STS}$ represents a number of space-time streams, $N^{Tone}_{EHT-GF-LTF}$ represents a number of subcarriers with energy in the target long training field, $w_{T_{EHT-GF-LTF}}(t)$ represents a window function of the target long training field, $N_{SR}$ represents an index of a highest data subcarrier among all data subcarriers of the target long training field, exp( ) represents obtaining an exponent, $T_{CS}^{i_{STS}}$ represents duration of a circular shift, $\gamma_k$ represents a phase rotation factor, $P_{EHT-LTF}$ represents a mapping matrix of the target long training field, $Q_k$ represents a precoding matrix of a $k^{th}$ subcarrier, $\Delta_F$ represents a subcarrier spacing of the target long training field, and $T_{GI}$ represents a guard interval.

In a possible implementation, a modulation scheme of a first symbol following the target long training field in the PPDU may be quadrature binary phase shift keying (English full name: quadrature binary phase shift keying, English abbreviation: QBPSK). QBPSK has 90-degree phase rotation relative to BPSK. Specifically, QBPSK and BPSK have a same modulation order. For BPSK, a constellation diagram of BPSK includes two constellation points, where the two constellation points are both located on the I axis, one is located on the negative semiaxis of the I axis, indicating 0, and the other is located on the positive semiaxis of the I axis, indicating 1. For QBPSK, a constellation diagram of QBPSK includes two constellation points, where the two constellation points are both located on the Q axis, one is located on the negative semiaxis of the Q axis, indicating 0, and the other is located on the positive semiaxis of the Q axis, indicating 1. Therefore, the constellation diagram of QBPSK may be considered as a constellation diagram obtained after the constellation diagram of BPSK is rotated by 90 degrees.

An effect achieved by designing the modulation scheme of the first symbol as QBPSK may include at least: On the basis that a PPDU format is distinguished from another PPDU format by using the target long training sequence, the difference between the PPDU format and the another PPDU format can be expanded by designing the modulation scheme of the first symbol as QBPSK, so that the information receiving apparatus can further determine the PPDU format based on whether the modulation scheme of the first symbol following the target long training field is QBPSK, thereby helping the information receiving apparatus detect the PPDU format and improving accuracy of detecting the PPDU format by the information receiving apparatus.

Optionally, an information bandwidth of the target signaling field in the PPDU is greater than 20 MHz, and the information bandwidth refers to a basic bandwidth for carrying information coding. In a process of generating a target signaling field, an information bandwidth may be used as a basic information unit, and each information bandwidth is independently encoded. If the bandwidth of the PPDU is greater than the information bandwidth, information is copied and transmitted in the unit of the information bandwidth at different frequencies.

By designing the information bandwidth of the target signaling field to be greater than 20 MHz, an effect achieved may include at least: Information bandwidths of a legacy signaling field (English full name: legacy signaling field, English abbreviation: L-SIG), a very high throughput signaling field A (English full name: very high throughput signaling field A, English: VHT-SIGA), and a high efficient signaling field A (English full name: high efficient signaling field A, English abbreviation: HE-SIGA) are equal to 20 MHz. Therefore, when information about the several signaling fields is sent, a single symbol carries less information, and more symbols needs to be occupied. Therefore, efficiency of transmitting the information about the several signaling fields is relatively low. However, in this embodiment, the information bandwidth of the target signaling field is expanded from 20 MHz to be greater than 20 MHz, so that information carried by a single symbol may be increased exponentially. Therefore, when information about the target signaling field is sent, the number of symbols that need to be occupied may be reduced exponentially, thereby greatly improving efficiency of transmitting the information about the target signaling field. For example, if the information bandwidth of the target signaling field is 40 MHz, information carried by a single symbol may be doubled, and when the information of the target signaling field is sent, the number of symbols that need to be occupied may be halved.

302. The information sending apparatus sends the PPDU.

303. The information receiving apparatus receives a data unit.

The information receiving apparatus may receive a target short training field of the data unit, and discover the data unit based on the target short training field of the data unit. A manner of receiving a target short training field by the information receiving apparatus may be the same as a manner of receiving a legacy short training field. For example, the information receiving apparatus may store an autocorrelation algorithm and/or a cross-correlation algorithm used when receiving a legacy short training field, and receive a target short training field by using the autocorrelation algorithm and/or the cross-correlation algorithm. In addition, the information receiving apparatus may receive a target long training field of the data unit, and obtain a long training sequence from the target long training field of the data unit, to perform the following steps based on the long training sequence.

304. When the long training sequence in the data unit meets a first condition, the information receiving apparatus determines that the data unit is a PPDU in a preset format.

The first condition is used to determine whether the long training sequence is the target long training sequence in the PPDU in the preset format. The information receiving apparatus may determine whether the long training sequence in the data unit meets the first condition, and when the long training sequence in the data unit meets the first condition, determine that the data unit is the PPDU in the preset format. For example, step 304 may include any one of the following implementations 1 to 2.

Implementation 1: The information receiving apparatus performs cross-correlation between the long training sequence in the data unit and a prestored target long training sequence to obtain a first result, and the information receiving apparatus may determine whether the first result is greater than a first threshold. When the first result is greater than the first threshold, it indicates that the first result is large enough, namely, the correlation between the long training sequence in the received data unit and the target long training sequence is high enough. Therefore, a probability that the long training sequence in the received data unit is the target long training sequence is high enough, and the information receiving apparatus determines that the data unit is the PPDU in the preset format.

In implementation 1, the first condition is that the first result is greater than the first threshold. The first threshold may be prestored in the information receiving apparatus. For example, if the first result is normalized to a value between 0 and 1, the first threshold may be 0.9, 0.99, or the like.

Implementation 2: The following (2.1) to (2.3) may be included:

(2.1) The information receiving apparatus performs cross-correlation between the long training sequence in the data unit and a prestored target long training sequence to obtain a first result.

The information receiving apparatus may prestore the prestored target long training sequence, and when receiving the data unit, the information receiving apparatus may locally read the prestored target long training sequence, to perform (2.1) by using the prestored target long training sequence.

The first result is a result obtained after cross-correlation is performed between the long training sequence in the received data unit and the target long training sequence. The cross-correlation can check a degree of correlation between two sequences. Therefore, a larger first result indicates a higher degree of correlation between the long training sequence and the target long training sequence, namely, a stronger orthogonality between the long training sequence and the target long training sequence. Therefore, a higher probability that the long training sequence is the target long training sequence indicates a higher probability that the data unit is the PPDU in the preset format.

(2.2) The information receiving apparatus performs cross-correlation between the long training sequence in the data unit and a legacy long training sequence or a high throughput long training sequence to obtain a second result.

The legacy long training sequence or the high throughput long training sequence may be prestored in the information receiving apparatus. When receiving the data unit, the information receiving apparatus may locally read the legacy long training sequence or the high throughput long training sequence to perform (2.2) by using the legacy long training sequence or the high throughput long training sequence.

The second result is a result obtained after cross-correlation is performed between the long training sequence in the received data unit and the legacy long training sequence or the high throughput long training sequence. A smaller second result indicates that a lower degree of correlation between the long training sequence and the legacy long training sequence or the high throughput long training sequence, namely, a weaker orthogonality between the long training sequence and the target long training sequence. Therefore, a higher probability that the long training sequence is the target long training sequence indicates a higher probability that the data unit is the PPDU in the preset format.

In a possible implementation, (2.1) and (2.2) may specifically include the following step 1 to step 4.

Step 1: The information receiving apparatus obtains a signal to interference plus noise ratio of at least one subcarrier of the target long training field.

The signal to interference plus noise ratio is a signal to interference plus noise ratio (English full name: signal to interference plus noise ratio, English abbreviation: SINR). The signal to interference plus noise ratio is a quotient obtained by dividing a dividend by a divisor by using a strength of a useful signal as the divisor and a sum of strengths of an interference signal and a noise signal as the divisor. The target long training field may include two symbols, and each symbol may include a plurality of subcarriers. The information receiving apparatus may obtain a signal to interference plus noise ratio of each subcarrier of each symbol of the two symbols as the signal to interference plus noise ratio used in the following step 2.

Step 2: The information receiving apparatus selects a target subcarrier from the at least one subcarrier based on the signal to interference plus noise ratio of the at least one subcarrier.

The target subcarrier is a subcarrier that meets a second condition. For each subcarrier of the at least one subcarrier, the information receiving apparatus may determine whether a signal to interference plus noise ratio of the subcarrier meets the second condition, and when the signal to interference plus noise ratio of the subcarrier meets the second condition, select the subcarrier as the target subcarrier.

The second condition may include any one of the following condition (1) and condition (2):

Condition (1) The signal to interference plus noise ratio is greater than a signal to interference plus noise ratio threshold.

If the second condition is condition (1), for each subcarrier in the at least one subcarrier, the information receiving apparatus may determine whether a signal to interference plus noise ratio of the subcarrier is greater than a signal to interference plus noise ratio threshold; and when the signal to interference plus noise ratio of the subcarrier is greater than the signal to interference plus noise ratio threshold, select the subcarrier as the target subcarrier. The signal to interference plus noise ratio threshold may be prestored in the information receiving apparatus, and a specific value of the signal to interference plus noise ratio threshold may be set based on a requirement. This is not limited in this embodiment.

Condition (2) The signal to interference plus noise ratio is ranked first by a preset digit.

When the second condition is condition (2), the information receiving apparatus may rank the at least one subcarrier in descending order of signal to interference plus noise ratios based on the signal to interference plus noise ratio of each subcarrier, and select a subcarrier whose signal to interference plus noise ratio is ranked first by a preset digit, as the target subcarrier. The preset digit may be prestored in the information receiving apparatus, the preset digit may be a positive integer, and a specific value of the preset digit may be set based on a requirement. This is not limited in this embodiment.

After selecting the target subcarrier, the information receiving apparatus may obtain a first sequence based on the target subcarrier. The first sequence is a sequence carried by the target subcarrier in the long training sequence. In a possible implementation, if the target subcarrier is M subcarriers, for each of the M subcarriers, the information receiving apparatus may obtain a value carried by the subcarrier, to obtain M values, and the information receiving apparatus may use the M values as the first sequence. The M values are in a one-to-one correspondence with M subcarriers, and M is a positive integer.

In an exemplary scenario, if the target long training field includes 64 subcarriers, the 64 subcarriers are a subcarrier whose sequence number is −32 to a subcarrier whose sequence number is 31, and the target subcarriers are 40 subcarriers of the 64 subcarriers. The 40 subcarriers are a subcarrier whose sequence number is −20 to a subcarrier whose sequence number is 19. In this scenario, the information receiving apparatus may obtain a value carried by the subcarrier whose sequence number is −20, a value carried by a subcarrier whose sequence number is −19, to a value carried by a subcarrier whose sequence number is −19, to obtain 40 values, and use the 40 values as the first sequence.

Step 3: The information receiving apparatus performs cross-correlation between the long training sequence and the target long training sequence based on the target subcarrier to obtain a first result.

In a possible implementation, step 3 may include the following step 3.1 to step 3.2:

Step 3.1 The information receiving apparatus obtains a second sequence based on the first sequence.

The second sequence is a sequence that is in the target long training sequence and that corresponds to the first sequence in position. For example, if the long training sequence in the received data unit is denoted as Lx, the target long training sequence is denoted as $L_1$, and the first sequence obtained based on the target subcarrier is Lx(k1, k2), the second sequence may be $L_1$(k1, k2). Lx(k1, k2) represents a value whose sequence number is k1 in Lx to a value whose sequence number is k2 in Lx, and $L_1$(k1, k2)

represents a value whose sequence number is k1 in $L_1$ to a value whose sequence number is k2 in $L_1$, where k1 is an integer, and k2 is an integer.

For example, if the first sequence is Lx(−20, 19), values whose sequence numbers are −20 to 19 in the target long training sequence may be obtained, namely, $L_1(-20)$, $L_1(-19)$, and $L_1(-18)$ to $L_1(19)$ are obtained, and $L_1(-20, 19)$, and $L_1(-20, 19)$ may be used as the second sequence.

Step 3.2 The information receiving apparatus performs cross-correlation between the first sequence and the second sequence to obtain a first result.

Step 4: The information receiving apparatus performs cross-correlation between the long training sequence and the legacy long training sequence or the high throughput long training sequence based on the target subcarrier to obtain a second result.

In a possible implementation, step 4 may include the following step 4.1 to step 4.2.

Step 4.1 The information receiving apparatus obtains a third sequence based on the first sequence.

The third sequence is a sequence that is in the legacy long training sequence or the high throughput long training sequence and that corresponds to the first sequence in position. For example, if the long training sequence in the received data unit is denoted as Lx, the legacy long training sequence or the high throughput long training sequence is denoted as $L_2$, and the first sequence obtained based on the target subcarrier is denoted as Lx(k1, k2), the second sequence may be $L_2$(k1, k2). Lx(k1, k2) represents a value whose sequence number is k1 in Lx to a value whose sequence number is k2 in Lx, and $L_2$(k1, k2) represents a value whose sequence number is k1 in L2 to a value whose sequence number is k2 in L2, where k1 is an integer, and k2 is an integer.

For example, if the first sequence is Lx(−20, 19), values whose sequence numbers are −20 to 19 in the legacy long training sequence or the high throughput long training sequence, which are $L_2(-20)$, $L_2(-19)$, and $L_2(-18)$ to $L_2(19)$, may be obtained, namely, $L_2(-20, 19)$ is obtained, and $L_2(-20, 19)$ may be used as the third sequence.

Step 4.2 The information receiving apparatus performs cross-correlation between the first sequence and the third sequence to obtain a second result.

(2.3) When the first result and the second result meet a preset magnitude relationship, the information receiving apparatus determines that the data unit is the PPDU in the preset format.

The information receiving apparatus may determine, based on the first result and the second result, whether the first result and the second result meet the first condition. When the first result and the second result meet the preset magnitude relationship, the information receiving apparatus may determine that the data unit is the PPDU in the preset format. When the first result and the second result do not meet the first condition, the information receiving apparatus may determine that the PPDU format is not the preset format.

In a possible implementation, the preset magnitude relationship may be that the first result is greater than or equal to the second result, and the information receiving apparatus may determine whether the first result is greater than the second result. When the first result is greater than the second result, the information receiving apparatus may determine that the data unit is the PPDU in the preset format. When the first result is not greater than the second result, the information receiving apparatus may determine that the PPDU format is not the preset format.

In another possible implementation, the preset magnitude relationship may be that the first result is greater than a product of the second result and a preset coefficient, and the information receiving apparatus may obtain the product of the second result and the preset coefficient, and determine whether the first result is greater than the product. When the first result is greater than the product, the information receiving apparatus determines that the data unit is the PPDU in the preset format. When the first result is not greater than the product, the information receiving apparatus may determine that the PPDU format is not the preset format. The preset coefficient may be set based on a requirement, for example, may be a value close to 1. A specific value of the preset coefficient is not limited in this embodiment.

The preset format may be a high throughput PPDU format. In a possible implementation, the preset format may be a PPDU format provided by a next generation standard of 802.11ax. The preset format may be referred to as an extremely high throughput (English full name: extremely high throughput, English abbreviation: EHT) format. Certainly, the preset format has other names than the EHT format. For example, the preset format may also be referred to as an extreme throughput (English full name: extremely throughput, English abbreviation: XT), or an ultra high throughput (English full name: ultra high throughput, English abbreviation: UHT). The preset format may be referred to as a green field (English full name: green field, English abbreviation: GF) format, and the green field format refers to a PPDU format prefixed with a high throughput preamble.

It should be noted that the information receiving apparatus may first perform (2.1) and then perform (2.2); or the information receiving apparatus may first perform (2.2) first and then perform (2.1); or the information receiving apparatus may perform (2.1) and (2.2) in parallel, and a time sequence of (2.1) and (2.2) is not limited in this embodiment.

After the information receiving apparatus determines that the data unit is the PPDU in the preset format, the information receiving apparatus may further process the PPDU based on a WLAN standard corresponding to the preset format, to meet an information transmission requirement corresponding to the WLAN standard. The WLAN standard corresponding to the preset format may include a parsing manner, a receiving rate, and the like. The information receiving apparatus may parse a data field of the PPDU in the parsing manner. In addition, the information receiving apparatus may receive a part after the target long training field of the data unit based on the receiving rate. A processing procedure after the information receiving apparatus determines the PPDU format is not limited in this embodiment.

Optionally, the foregoing step 304 may be replaced with: When the data unit meets the first condition, and the modulation scheme of the first symbol following the target long training field of the data unit is QBPSK, determine that the data unit is a physical layer protocol data unit PPDU in a preset format, where the target long training field includes a long training sequence. Specifically, the information receiving apparatus may read the first symbol following the target long training field, and determine whether a modulation scheme of the first symbol is QBPSK. When the data unit meets the first condition and the modulation scheme of the first symbol is QBPSK, the information receiving apparatus determines that the data unit is the PPDU in the preset format. When the data unit does not meet the first condition or the modulation scheme of the first symbol is not QBPSK, the information receiving apparatus determines that the PPDU format is not the preset format. The information receiving apparatus may first determine whether the modulation scheme of the first symbol following the target long training field is QBPSK, and when the modulation scheme of the first symbol is QBPSK, determine whether the data unit meets the first condition. The information receiving apparatus may alternatively first determine whether the data unit meets the first condition, and when determining whether the data unit meets the first condition, determine whether the modulation scheme of the first symbol following the target long training field is QBPSK. The information receiving apparatus may alternatively determine, in parallel, whether the data unit meets the first condition and whether the modulation scheme of the first symbol following the target long training field is QBPSK, and a time sequence of the two determining steps is not limited in this embodiment. In addition, this replacement manner and step 304 are two parallel manners. Whether to perform this replacement manner or step 304 is not limited in this embodiment.

Optionally, when the data unit meets the first condition, if the information receiving apparatus determines that the modulation scheme of the first symbol following the target long training field is not QBPSK, the information receiving apparatus may stop receiving the data unit; or the information receiving apparatus may determine that the PPDU format is a format other than the preset format, and continue to determine that the PPDU format is which format other than the preset format. In a possible implementation, when the information receiving apparatus determines that the PPDU format is not the preset format, a process of determining the PPDU format by the information receiving apparatus may include: The information receiving apparatus reads the first symbol following the target long training field, and determines whether the modulation scheme of the first symbol is QBPSK, and when the modulation scheme of the first symbol is QBPSK, the information receiving apparatus determines that the PPDU format is a high throughput greenfield (English full name: high throughput greenfield, English abbreviation: HT-GF) format; when the modulation scheme of the first symbol is not QBPSK, the information receiving apparatus determines that the PPDU format is not the HT-GF format, and the information receiving apparatus continues to determine whether the second symbol following the target long training field is the same as the first symbol, and determines whether a length field in the target signaling field is divisible by 3; and when the second symbol is the same as the first symbol, and the length field is not divisible by 3, the information receiving apparatus determines that the PPDU format is a high efficient (English full name: high efficient; English abbreviation: HE) format. In addition, when the second symbol is different from the first symbol, the information receiving apparatus determines that the PPDU format is not the HE format, or when the second symbol is the same as the first symbol and the length field is divisible by 3, the information receiving apparatus determines that the PPDU format is not the HE format, and the information receiving apparatus continues to determine that the PPDU format is a high throughput mixed (English full name: high throughput mixed; English abbreviation: HT-MF) format, a very high throughput (English full name: very high throughput; English abbreviation: VHT) format, or a non-high throughput (English full name: non-high throughput, English abbreviation: Non-HT) format; the information receiving apparatus determines whether the modulation scheme of the second symbol is QBPSK or BPSK, and when the modulation scheme of the second symbol is QBPSK, the information receiving apparatus determines that the PPDU format is the HT-MF format; when the modulation scheme of the second symbol is BPSK, and a modulation scheme of the third symbol is QBPSK, the information receiving apparatus determines that the PPDU format is the VHT format; and when the information receiving apparatus performs the foregoing procedures and determines that the PPDU format is none of the HT-GF format, the HE format, the HT-MF format, or the VHT format, the information receiving apparatus determines that the PPDU format is the Non-HT format.

It should be noted that this embodiment may be applied to a scenario in which an access point communicates with an access point, and the information sending apparatus and the information receiving apparatus in step 301 to step 304 may be access points. This embodiment may also be applied to a scenario in which a station communicates with a station, and the information sending apparatus and the information receiving apparatus in step 301 to step 304 may be stations. This embodiment may also be applied to a scenario in which an access point communicates with a station, and the information sending apparatus in step 301 to step 304 may be an access point, the information receiving apparatus may be a station, or the information sending apparatus in step 301 to step 304 may be a station, and the information receiving apparatus may be an access point. Certainly, the information sending apparatus may alternatively be another logical function entity in a WLAN, and the information receiving apparatus may alternatively be another logical function entity in the WLAN. Specific forms of the information sending apparatus and the information receiving apparatus are not limited in this embodiment.

The method provided in this embodiment provides a new PPDU format, and a long training sequence in the PPDU in the new format is orthogonal to the legacy long training sequence or orthogonal to the high throughput long training sequence. When the PPDU in this format is received, the PPDU format can be automatically detected by using the long training sequence, to perform further processing on the PPDU based on a WLAN standard corresponding to the PPDU format. In addition, when the target long training field is read, the PPDU format can be detected. Compared with a method of detecting the PPDU format by reading a signaling field, a time for detecting the PPDU format is saved, efficiency of detecting the PPDU format is improved, and detection can be completed as soon as possible. In addition, by using the new long training sequence, the PPDU format provided in this embodiment can be distinguished from a PPDU format of each generation WLAN standard, to ensure accuracy of identifying the PPDU format, and prevent the PPDU format from being confused with a PPDU format of a previous WLAN standard, thereby meeting an information transmission requirement of a next generation WLAN standard.

In a possible implementation, a new PPDU format may be provided by using phase rotation and additional features, and a function of automatically detecting the PPDU format is implemented. The following provides description in detail by using the embodiment of FIG. 8. It should be noted that the embodiment of FIG. 8 focuses on a difference between the embodiment of FIG. 8 and the embodiment of FIG. 3. For content similar to that in FIG. 3, refer to the embodiment of FIG. 3. Details are not described again in the embodiment of FIG. 8.

Figures 8, 9:
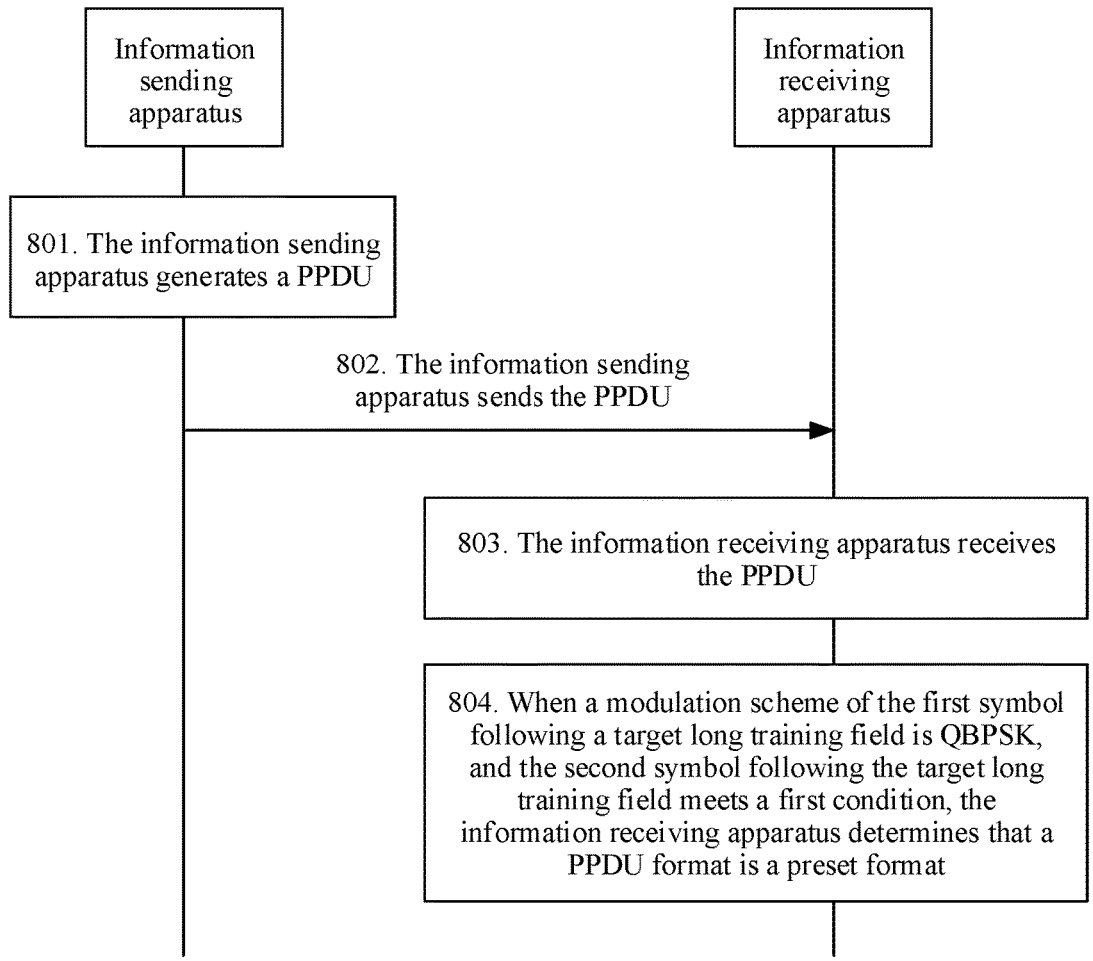
FIG. 8 is a flowchart of an information transmission example according to an embodiment of this application.
FIG. 9 is a schematic diagram of a PPDU format according to an embodiment of this application.

FIG. 8 is a flowchart of an information transmission example according to an embodiment of this application. The information transmission example includes an information sending method performed by an information sending apparatus and an information receiving method performed by an information receiving apparatus. As shown in FIG. 8, the method includes the following steps 801 to 804.

801. The information sending apparatus generates a PPDU.

The PPDU may include a target short training field and a target long training field, and there are at least two symbols after the target long training field of the PPDU. FIG. 9 shows a schematic diagram of a PPDU format. An ellipsis in FIG. 9 represents other symbols included in the PPDU although not shown. A specific symbol represented by the ellipsis is not limited in this embodiment.

In a possible implementation, refer to FIG. 10. The target short training field in the embodiment of FIG. 8 may be a legacy short training field, and the target long training field in the embodiment of FIG. 8 may be a legacy long training field. A field following the target long training field may be an extremely high throughput signaling field, the first symbol following the target long training field may be the first symbol of the extremely high throughput signaling field, and the second symbol following the target long training field may be the second symbol of the extremely high throughput signaling field. In FIG. 10, M represents the number of symbols of the extremely high throughput signaling field, and M is a positive integer.

By designing a field for carrying a short training sequence in the PPDU as a legacy short training field, impact caused when coarse synchronization of frequency and time is performed on the received data unit after the legacy short training field is modified can be avoided. By designing a field for carrying a long training sequence in the PPDU as a legacy long training field, impact caused when coarse synchronization of frequency and time is performed on the received data unit after the legacy long training field is modified can be avoided.

Certainly, the target short training field in the embodiment of FIG. 8 may alternatively be a field for carrying a short training sequence in any generation WLAN standard after 802.11ax. The target long training field in the embodiment of FIG. 8 may alternatively be a field for carrying a long training sequence in any generation WLAN standard after 802.11ax. Neither a format of the target short training field nor a format of the target long training field is limited in the embodiment of FIG. 8.

The first symbol following the target long training field: A modulation scheme of the first symbol following the target long training field may be QBPSK. The first symbol following the target long training field may be the fifth OFDM symbol of the PPDU. Duration of the first symbol following the target long training field may be 4 µs. The first symbol following the target long training field may be the first symbol of the target signaling field. The first symbol following the target long training field may be denoted as EHT-SIG-A0, where EHT represents a preset format, SIG represents a target signaling field, A represents a symbol, and A0 represents the first symbol.

The second symbol following the target long training field: The second symbol following the target long training field meets a third condition. The second symbol following the target long training field may be the sixth OFDM symbol of the PPDU. Duration of the second symbol following the target long training field may be 4 µs. The second symbol following the target long training field may be the second symbol of the target signaling field. The first symbol following the target long training field may be denoted as EHT-SIG-A1, where EHT represents a preset format, SIG represents a target signaling field, A represents a symbol, and A1 represents the second symbol.

The third condition may be any one of the following third condition (1) to the third condition (4):

Third condition (1): The second symbol is the same as the first symbol.

In third condition (1), the second symbol may be completely the same as the first symbol, namely, a feature of each dimension of the second symbol may be the same as a feature of each dimension of the first symbol. For example, feature dimensions of the symbol are content, a modulation scheme, and an interleaver. Content of the second symbol may be the same as content of the first symbol, a modulation scheme of the second symbol may be the same as a modulation scheme of the first symbol, and an interleaver used for the second symbol is the same as an interleaver used for the first symbol. Certainly, the symbol may also have features of other dimensions, and details are not described herein.

Third condition (2): Content of the second symbol is the same as content of the first symbol, a modulation scheme of the second symbol is the same as a modulation scheme of the first symbol, and an interleaver used for the second symbol is different from an interleaver used for the first symbol.

In third condition (2), the first symbol may be interleaved by using a first interleaver, the second symbol may be interleaved by using a second interleaver, the first interleaver may be any interleaver, and the second interleaver is different from the first interleaver. A modulation scheme of the second symbol is QBPSK. In addition, for features of other dimensions than the content, the modulation scheme, and the interleaver, features of other dimensions of the second symbol and features of other dimensions of the first symbol may be designed as one or more features being the same or one or more features being different, which may be specifically designed based on a requirement. The features of other dimensions of the second symbol and the features of other dimensions of the first symbol are not limited in this embodiment.

Third condition (3): Content of the second symbol is the same as content of the first symbol, a modulation scheme of the second symbol is the same as a modulation scheme of the first symbol, and the first symbol has been interleaved and the second symbol has not been interleaved.

In third condition (3), the modulation scheme of the second symbol is QBPSK. In addition, for features of other dimensions than the content, the modulation scheme, and whether interleaving has been performed, features of other dimensions of the second symbol and features of other dimensions of the first symbol may be designed as one or more features being the same or one or more features being different, which may be specifically designed based on a requirement. The features of other dimensions of the second symbol and the features of other dimensions of the first symbol are not limited in this embodiment.

Third condition (4): A modulation scheme of the second symbol is BPSK.

In addition, for features of other dimensions than the modulation scheme, features of other dimensions of the second symbol and features of other dimensions of the first symbol may be designed as one or more features being the same or one or more features being different, which may be specifically designed based on a requirement. The features of other dimensions of the second symbol and the features of other dimensions of the first symbol are not limited in this embodiment.

802. The information sending apparatus sends the PPDU.

803. The information receiving apparatus receives a data unit.

804. When a modulation scheme of the first symbol following the target long training field is QBPSK, and the second symbol following the target long training field meets a third condition, the information receiving apparatus determines that the data unit is a PPDU in a preset format.

In a possible implementation, the information receiving apparatus may read the first symbol following the target long training field and the second symbol following the target long training field, determine whether a modulation scheme of the first symbol is QBPSK, and determine whether the second symbol meets the third condition. When the modulation scheme of the first symbol is QBPSK, and the second symbol meets the third condition, the information receiving apparatus determines that the data unit is the PPDU in the preset format. In addition, when the modulation scheme of the first symbol following the target long training field is not QBPSK, or the second symbol following the target long training field does not meet the third condition, the information receiving apparatus may determine that the PPDU format is not the preset format.

The information receiving apparatus may first determine whether the modulation scheme of the first symbol is QBPSK, and when the modulation scheme of the first symbol is QBPSK, determine whether the second symbol meets the third condition. The information receiving apparatus may alternatively determine, in parallel, whether the modulation scheme of the first symbol is QBPSK and whether the second symbol meets the third condition. A determining sequence is not limited in this embodiment.

For example, the third condition is third condition (1). Step 804 may be: The information receiving apparatus may determine whether a modulation scheme of the first symbol following the target long training field is QBPSK; when the modulation scheme of the first symbol is QBPSK, the information receiving apparatus compares the second symbol following the target long training field with the first symbol following the target long training field; and when the second symbol is the same as the first symbol, the information receiving apparatus determines that the data unit is the PPDU in the preset format.

For example, the third condition is third condition (2). Step 804 may be: The information receiving apparatus may determine whether a modulation scheme of the first symbol following the target long training field is QBPSK; when the modulation scheme of the first symbol is QBPSK, compare content of the second symbol following the target long training field with content of the first symbol following the target long training field; when the content of the second symbol is the same as the content of the first symbol, determine whether an interleaver used for the second symbol is different from an interleaver used for the first symbol, or determine whether the second symbol has not been interleaved and the first symbol has been interleaved; and when the interleaver used for the second symbol is different from the interleaver used for the first symbol, or when the second symbol has not been interleaved and the first symbol has been interleaved, the information receiving apparatus determines that the data unit is the PPDU in the preset format.

In a possible implementation, the process of determining that the interleaver used for the second symbol is different from the interleaver used for the first symbol may include the following step 1 to step 3.

Step 1: The information receiving apparatus de-interleaves the first symbol by using a first interleaver, to obtain first data.

The first data is data obtained after the first symbol is de-interleaved.

Step 2: The information receiving apparatus de-interleaves the second symbol by using a second interleaver, to obtain second data, where the second interleaver is different from the first interleaver.

The second data is data obtained after the second symbol is de-interleaved.

It should be noted that the information receiving apparatus may first perform step 1 and then perform step 2, or the information receiving apparatus may perform step 2 first and then perform step 1, or the information receiving apparatus may perform step 1 and step 2 in parallel, and a time sequence of step 1 and step 2 is not limited in this embodiment.

Step 3: When the first data is the same as the second data, the information receiving apparatus determines that the interleaver used for the second symbol is different from the interleaver used for the first symbol.

The information receiving apparatus may compare the first data with the second data. When the first data is the same as the second data, the information receiving apparatus determines that the interleaver used for the second symbol is different from the interleaver used for the first symbol.

In a possible implementation, a process of determining that the first symbol has been interleaved and the second symbol has not been interleaved may include the following steps A to B.

Step A: The information receiving apparatus de-interleaves the first symbol to obtain first data.

Step B: When the first data is the same as the second symbol, the information receiving apparatus determines that the first symbol has been interleaved and the second symbol has not been interleaved.

The information receiving apparatus may compare the first data with the second symbol, and when the first data is the same as the second symbol, the information receiving apparatus determines that the first symbol has been interleaved and the second symbol has not been interleaved.

For example, the third condition is third condition (3). Step 804 may be: The information receiving apparatus may determine whether a modulation scheme of the first symbol following the target long training field is QBPSK; when the modulation scheme of the first symbol is QBPSK, the information receiving apparatus determines whether a modulation scheme of the second symbol following the target long training field is BPSK; and when the modulation scheme of the second symbol is BPSK, the information receiving apparatus determines that the data unit is the PPDU in the preset format.

The method provided in this embodiment provides a new PPDU format, the modulation scheme of the first symbol following the target long training field in the PPDU is QBPSK, and the second symbol following the target long training field meets the third condition. The PPDU format can be automatically detected based on a phase of the first symbol following the target long training field and whether the second symbol meets the third condition, and the PPDU format can be detected when the second symbol following the target long training field is read, thereby saving time overheads.

In a possible implementation, a new PPDU format may be provided by using phase rotation and a signature field, and a function of automatically detecting the PPDU format is implemented. The following describes in detail the embodiment of FIG. 11. It should be noted that the embodiment of FIG. 11 focuses on a difference between the embodiment of FIG. 11 and the embodiment of FIG. 3. For content similar to that in FIG. 3, refer to the embodiment of FIG. 3. Details are not described again in the embodiment of FIG. 11.

Figure 11:
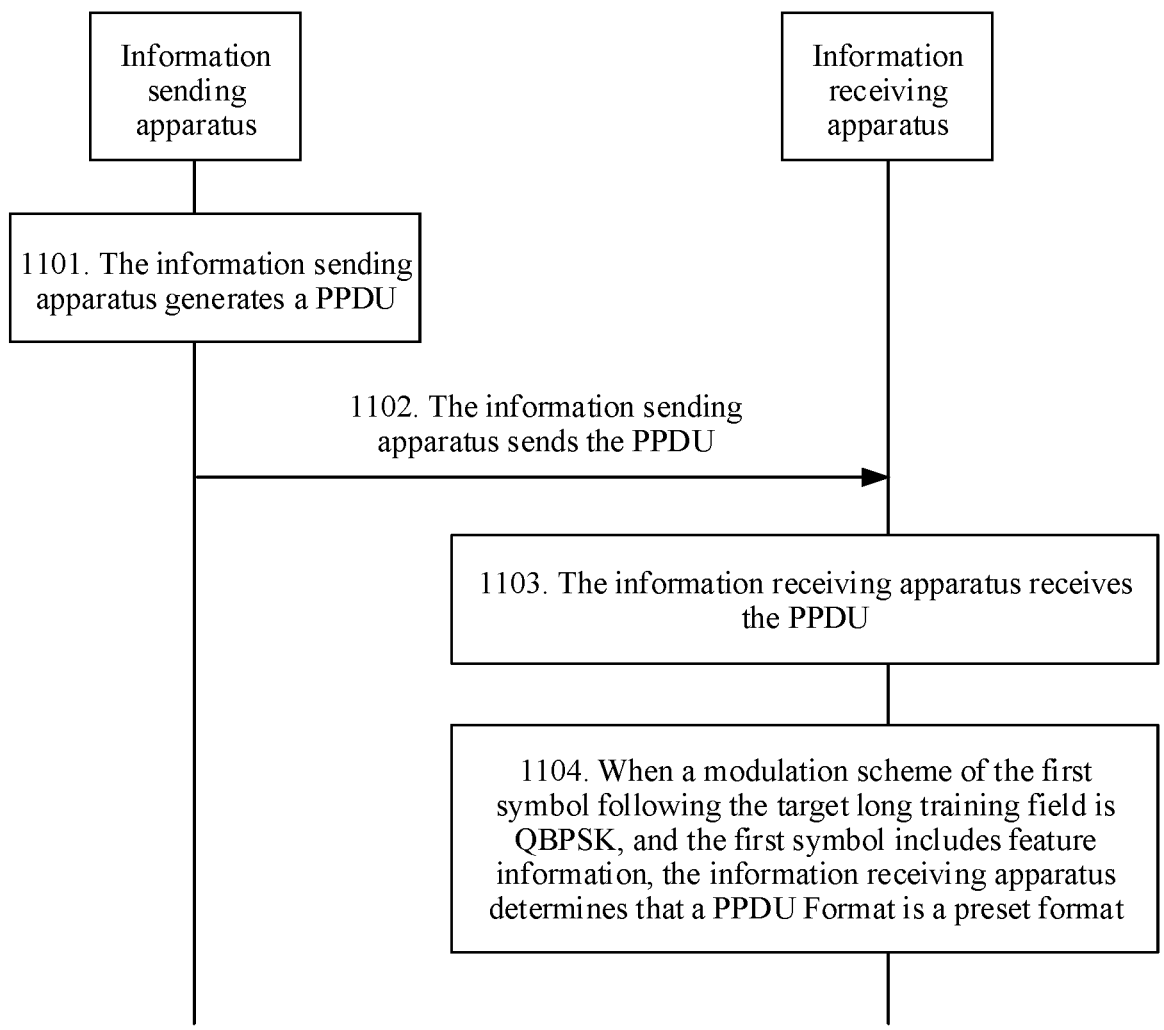
FIG. 11 is a flowchart of an information transmission example according to an embodiment of this application.

FIG. 11 is a flowchart of an information transmission example according to an embodiment of this application. The information transmission example includes an information sending method performed by an information sending apparatus and an information receiving method performed by an information receiving apparatus. As shown in FIG. 11, the method includes the following steps 1101 to 1104.

1101. The information sending apparatus generates a PPDU.

Figure 12:
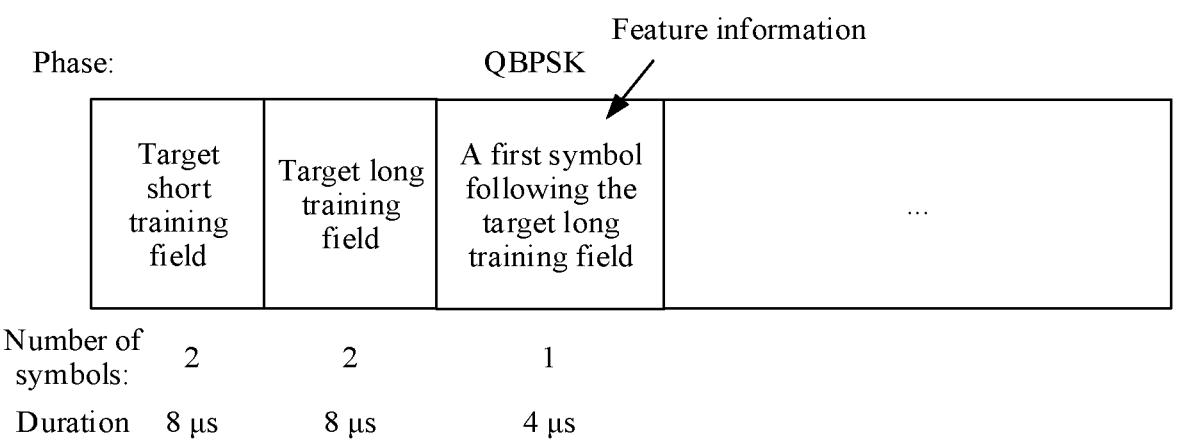
FIG. 12 is a schematic diagram of a PPDU forma according to an embodiment of this application.

The PPDU may include a target short training field and a target long training field, and there is at least one symbol following the target long training field of the PPDU. FIG. 12 shows a schematic diagram of a PPDU format. An ellipsis in FIG. 12 represents other symbols included in the PPDU although not shown. A specific symbol represented by the ellipsis is not limited in this embodiment.

In a possible implementation, refer to FIG. 13. The target short training field in the embodiment of FIG. 11 may be a legacy short training field, and the target long training field in the embodiment of FIG. 11 may be a legacy long training field. A field following the target long training field may be an extremely high throughput signaling field, the first symbol following the target long training field may be the first symbol of the extremely high throughput signaling field, and the second symbol following the target long training field may be the second symbol of the extremely high throughput signaling field. In FIG. 13, M represents the number of symbols of the extremely high throughput signaling field, and M is a positive integer.

By designing a field for carrying a short training sequence in the PPDU as a legacy short training field, impact caused when coarse synchronization of frequency and time is performed on the received data unit after the legacy short training field is modified can be avoided. By designing a field for carrying a long training sequence in the PPDU as a legacy long training field, impact caused when coarse synchronization of frequency and time is performed on the received data unit after the legacy long training field is modified can be avoided.

Certainly, the target short training field in the embodiment of FIG. 11 may alternatively be a field for carrying a short training sequence in any generation WLAN standard after 802.11ax. The target long training field in the embodiment of FIG. 11 may alternatively be a field for carrying a long training sequence in any generation WLAN standard after 802.11ax. Neither a format of the target short training field nor a format of the target long training field is specifically limited in the embodiment of FIG. 11.

The first symbol following the target long training field: A modulation scheme of the first symbol following the target long training field is QBPSK, and the first symbol includes feature information. The first symbol following the target long training field may be the fifth OFDM symbol of the PPDU. Duration of the first symbol following the target long training field may be 4 µs. The first symbol following the target long training field may be denoted as EHT-SIG-A0, where EHT represents a preset format, EHT-SIG represents a target signaling field, A represents a symbol, and A0 represents the first symbol.

The feature information is used to indicate that the PPDU format is a preset format. The feature information may be any combination of numbers, letters, or characters. For example, the feature information may be an American Standard Code for Information Interchange (English full name: American standard code for information interchange, English abbreviation: ASCII) value of "N". In a possible implementation, the feature information may be an identifier of a preset format, and the identifier of the preset format is used to uniquely determine a PPDU format, for example, may be a name or a number of the preset format.

The information sending apparatus may prestore the feature information, to generate, by using the feature information, the first symbol following the target long training field including the feature information, and send the first symbol following the target long training field including the feature information. The feature information is carried in the first symbol, so that a PPDU in a preset format can be distinguished from a PPDU format in another format. Therefore, the information receiving apparatus can determine, by identifying the feature information, that the data unit is the PPDU in the preset format rather than an HT GF format or another format.

In a possible implementation, the feature information may be carried in a signature field of the first symbol following the target long training field, and the signature field is a field at a preset position in the first symbol. The preset position may be prestored in the information sending apparatus. The preset position may be any position of the first position of the first symbol to the last position of the first symbol. A value of the preset position is not limited in this embodiment.

1102. The information sending apparatus sends the PPDU.

1103. The information receiving apparatus receives a data unit.

1104. When a modulation scheme of the first symbol following the target long training field is QBPSK, and the first symbol includes feature information, the information receiving apparatus determines that the data unit is a PPDU in a preset format.

In a possible implementation, after receiving the data unit, the information receiving apparatus may read the first symbol following the target long training field, determine whether the first symbol following the target long training field is QBPSK, and determine whether the first symbol includes feature information. When the modulation scheme of the first symbol following the target long training field is QBPSK, and the first symbol includes feature information, the information receiving apparatus may determine that the data unit is the PPDU in the preset format. In addition, when the modulation scheme of the first symbol following the target long training field is not QBPSK, or the first symbol does not include feature information, the information receiving apparatus may determine that the PPDU format is not the preset format.

According to the PPDU format and the format detection method provided in the embodiment of FIG. 11, the PPDU format can be detected when the first symbol following the target long training field is read, and compared with that the PPDU format is detected when the second symbol following the target long training field is read in the embodiment of FIG. 8, a time for completing detection may be advanced by one symbol, so that a time for detecting the PPDU format is shortened, and efficiency of detecting the PPDU format is improved. Therefore, further processing such as parsing can be performed on the PPDU in advance based on a WLAN standard corresponding to the PPDU format, thereby improving a PPDU processing speed.

It should be noted that, the information receiving apparatus may first determine whether the modulation scheme of the first symbol is QBPSK, and when the modulation scheme of the first symbol is QBPSK, determine whether the first symbol includes feature information. The information receiving apparatus may alternatively first determine whether the first symbol includes feature information, and when the first symbol includes feature information, determine whether the modulation scheme of the first symbol is QBPSK. The information receiving apparatus may alternatively determine, in parallel, whether the modulation scheme of the first symbol is QBPSK and whether the first symbol includes feature information. A determining sequence of the information receiving apparatus is not limited in this embodiment.

For a process of obtaining the feature information, in a possible implementation, the information receiving apparatus may determine a signature field from the first symbol following the target long training field, and obtain feature information from the signature field. For a process of determining a signature field, the information receiving apparatus may prestore a preset position, and determine, from the first symbol based on the preset position, a field at the preset position as the signature field.

The method provided in this embodiment provides a new PPDU format, the modulation scheme of the first symbol following the target long training field in the PPDU is QBPSK, and the first symbol includes feature information. The PPDU format can be automatically detected by using a phase and the feature information of the first symbol following the target long training field, and when the first symbol following the target long training field is read, the PPDU format can be detected, thereby saving a time for detecting the PPDU format, and improving efficiency of detecting the PPDU format.

Any combination of all the foregoing optional technical solutions may be used to form optional embodiments of this application. Details are not described herein again.

Figure 14:
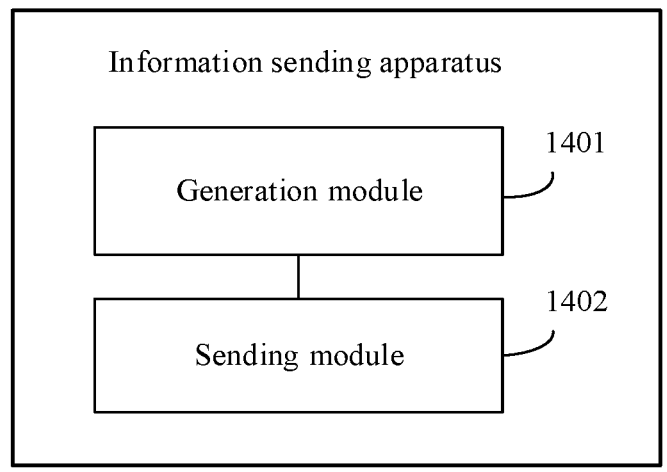
FIG. 14 is a schematic structural diagram of an information sending apparatus according to an embodiment of this application.

FIG. 14 is a schematic structural diagram of an information sending apparatus according to an embodiment of this application. As shown in FIG. 14, the apparatus includes:

a generation module 1401, configured to perform any one of step 301, step 801, and step 1101, and a sending module 1402, configured to perform any one of step 302, step 802, and step 1102.

It should be noted that, when the information sending apparatus provided in the embodiment of FIG. 14 sends information, division of the foregoing functional modules is merely used as an example for description. In actual application, the foregoing functions may be allocated to different functional modules for implementation based on a requirement. Namely, an internal structure of the information sending apparatus is divided into different functional modules, to implement all or some of the functions described above. In addition, the information sending apparatus and information sending method embodiments provided in the foregoing embodiments belong to a same concept. For a specific implementation process, refer to the method embodiments. Details are not described herein again.

It should be understood that the apparatus 1400 herein is embodied in a form of a functional module. The term "module" herein may refer to an application specific integrated circuit (application specific integrated circuit, ASIC), an electronic circuit, a processor configured to execute one or more software or firmware programs (for example, a shared processor, a proprietary processor, and a group processor) and a memory, merging logic, and/or other suitable components supporting the described functions. In an optional example, the information sending apparatus 1400 may be configured to perform procedures and/or steps corresponding to the information sending apparatus in the foregoing method embodiments. To avoid repetition, details are not described herein again.

The apparatus 1400 in the foregoing solutions has a function of implementing corresponding steps performed by the information sending apparatus in the foregoing methods. The function may be implemented by hardware, or may be implemented by hardware executing corresponding software. The hardware or software includes one or more modules corresponding to the function. For example, the sending module may be replaced by a transmitter, and the generation module may be replaced by a processor, to respectively perform the sending and receiving operations and the related processing operations in the method embodiments.

Figure 15:
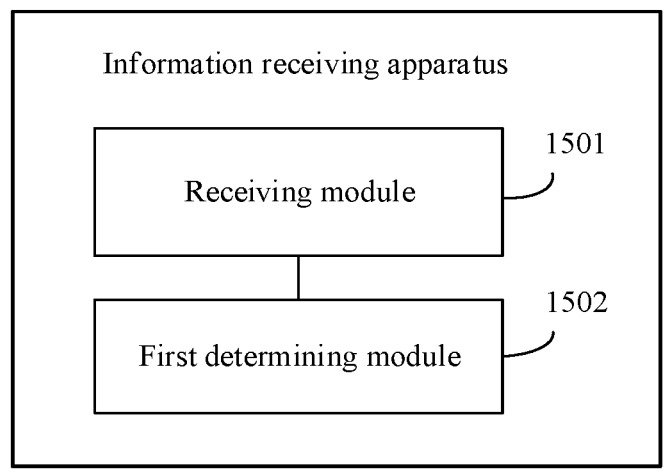
FIG. 15 is a schematic structural diagram of an information receiving apparatus according to an embodiment of this application.

FIG. 15 is a schematic structural diagram of an information receiving apparatus according to an embodiment of this application. As shown in FIG. 15, the apparatus includes:

a receiving module 1501, configured to perform step 303; and a first determining module 1503, configured to perform step 304.

In a possible implementation, the apparatus further includes: an obtaining module, configured to obtain a signal to interference plus noise ratio of a subcarrier; a selection module, configured to select a target subcarrier; and a cross-correlation module 1502, configured to perform cross-correlation between a long training sequence and a target long training sequence based on the target subcarrier; and perform cross-correlation between the long training sequence and a legacy long training sequence or a high throughput long training sequence based on the target subcarrier.

In a possible implementation, the obtaining module is configured to obtain a first sequence based on the target subcarrier; and the cross-correlation module 1502 is configured to obtain a second sequence based on the first sequence; perform cross-correlation between the first sequence and the second sequence; obtain a third sequence based on the first sequence; and perform cross-correlation between the first sequence and the third sequence.

In a possible implementation, the apparatus further includes a second determining module. The second determining module is configured to: when a long training sequence in a data unit meets a first condition, and a modulation scheme of a first symbol following the target long training field is QBPSK, determine that the data unit is a PPDU in a preset format.

In a possible implementation, the apparatus further includes a third determining module, configured to perform step 804.

In a possible implementation, the apparatus further includes a fourth determining module, configured to perform step 1104.

It should be noted that, when the information receiving apparatus provided in the embodiment of FIG. 15 receives information, division of the foregoing functional modules is merely used as an example for description. In actual application, the foregoing functions may be allocated to different functional modules for implementation based on a requirement. Namely, an internal structure of the information receiving apparatus is divided into different functional modules, to implement all or some of the functions described above. In addition, the information receiving apparatus and information receiving method embodiments provided in the foregoing embodiments belong to a same concept. For a specific implementation process, refer to the method embodiments. Details are not described herein again.

It should be understood that the apparatus 1500 herein is embodied in a form of a functional module. The term "module" herein may refer to an application specific integrated circuit (application specific integrated circuit, ASIC), an electronic circuit, a processor configured to execute one or more software or firmware programs (for example, a shared processor, a proprietary processor, and a group processor) and a memory, merging logic, and/or other suitable components supporting the described functions. In an optional example, a person skilled in the art may understand that the apparatus 1500 may be specifically the information receiving apparatus in the foregoing embodiments, and the apparatus 1500 may be configured to perform procedures and/or steps corresponding to the information receiving apparatus in the foregoing method embodiments. To avoid repetition, details are not described herein again.

The apparatus 1500 in the foregoing solutions has a function of implementing corresponding steps performed by the information receiving apparatus in the foregoing methods. The function may be implemented by hardware, or may be implemented by hardware executing corresponding software. The hardware or software includes one or more modules corresponding to the function. For example, the receiving module may be replaced by a receiver, and the cross-correlation module and the determining module may be replaced by a processor, to respectively perform the sending and receiving operations and the related processing operations in the method embodiments.

Any combination of all the foregoing optional technical solutions may be used to form optional embodiments of this application. Details are not described herein again.

In an exemplary embodiment, this application further provides an information transmission system. The system includes the information sending apparatus provided in the embodiment of FIG. 14, and further includes the information receiving apparatus provided in the embodiment of FIG. 15.

In an exemplary embodiment, a computer program product is provided, where the computer program product includes computer program code, and when the computer program code is run by a computer, the computer is enabled to perform at least one of the foregoing information sending method and information receiving method.

In an exemplary embodiment, a computer-readable medium for storing a computer program is provided, where the computer program includes instructions for performing at least one of the foregoing information sending method and information receiving method. For example, the computer-readable medium may be a read-only memory (English full name: read-only memory, English abbreviation: ROM), a random access memory (English full name: random access memory, English abbreviation: RAM), a compact disc read-only memory (English full name: compact disc read-only memory, English abbreviation: CD-ROM), a tape, a floppy disk, or an optical data storage device.

In an exemplary embodiment, this application further provides a chip, including a processor, configured to invoke, from a memory, instructions stored in the memory and run the instructions, so that a device on which the chip is installed performs at least one of the foregoing information sending method and information receiving method.

In an exemplary embodiment, this application further provides a chip, including an input interface, an output interface, a processor, and a memory. The input interface, the output interface, the processor, and the memory are connected through an internal connection path, and the processor is configured to execute code in the memory. When the code is executed, the processor is configured to perform at least one of the foregoing information sending method and information receiving method.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer program instructions. When the computer program instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired or wireless manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid-state drive), or the like.

The term "and/or" in this application describes only an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

In this application, the term "a plurality of" means two or more. For example, a plurality of data packets refer to two or more data packets.

In this application, terms such as "first" and "second" are used to distinguish a same item or similar item whose effects and functions are basically the same. A person skilled in the art may understand that the words "first" and "second" do not limit a quantity or an execution sequence.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely optional embodiments of this application, but are not intended to limit this application. Any modification, equivalent replacement, or improvement made without departing from the spirit and principle of this application should fall within the protection scope of this application.

What is claimed is:
1. The An information sending method comprising:
generating a physical layer protocol data unit (PPDU), wherein the PPDU comprises a target long training sequence, and the target long training sequence is orthogonal to a legacy long training sequence or orthogonal to a high throughput long training sequence; and sending the PPDU, wherein a bandwidth is equal to 20 megahertz (MHz), and an expression of the target long training sequence is any one of the following:

$L_{64}=[p_{32},p_{32}]$;

$L_{64}=[p_{32},-p_{32}]$;

$L_{64}=[-p_{32},p_{32}]$;

$L_{64}=[-p_{32},-p_{32}]$;

$L_{64}=[p_{32}(-16,-1),x1,p_{32}(1,13),-1,1,0,-1,-1,p_{32}(-13,-1),x2,p_{32}(1,15)]$;

$L_{64}=[p_{32}(-16,-1),x1,p_{32}(1,13),1,-1,0,1,1,p_{32}(-13,-1),x2,p_{32}(1,15)]$;

$L_{64}=[p_{32}(-16,-1),x1,p_{32}(1,13),1,-1,0,1,-1,p_{32}(-13,-1),x2,p_{32}(1,15)]$;

$L_{64}=[p_{32}(-16,-1),0,p_{32}(1,13),1,1,0,-1,-1,p_{32}(-13,-1),0,p_{32}(1,15)]$;

$L_{64}=[p_{32}(-16,-1),1,p_{32}(1,13),0,0,0,0,0,p_{32}(-13,-1),1,p_{32}(1,15)]$;

$L_{64}=[p_{32}(-16,-1),0,p_{32}(1,13),-1,1,0,-1,-1,p_{32}(-13,-1),0,p_{32}(1,15)]$;

$L_{64}=[p_{32}(-16,-1),0,p_{32}(1,13),1,-1,0,1,1,p_{32}(-13,-1),0,p_{32}(1,15)]$;

$L_{64}=[p_{32}(-16,-1),0,p_{32}(1,13),1,-1,0,1,-1,p_{32}(-13,-1),0,p_{32}(1,15)]$; or $L_{64}=[p_{32}(-16,-1,0,p_{32}(1,13),\mathbf{1,1,0,-1,-1},p_{32}(-13,-1),0,p_{32}(1,15)]$;

wherein $L_{64}$ represents the target long training sequence whose length is 64, x1 is −1 or 1, x2 is −1, $p_{32}$=[0 0 0 1 −1 1 −1 −1 1 −1 1 1 −1 1 1 1 0 −1 −1 −1 1 −1 −1 −1 1 −1 1 1 1 −1 0 0], $p_{32}(-16,-1)$ represents a sequence that is from a value whose sequence number is −16 in $p_{32}$ to a value whose sequence number is −1 in $p_{32}$, $p_{32}(1,13)$ represents a sequence that is from a value whose sequence number is 1 in $p_{32}$ to a value whose sequence number is 13 in $p_{32}$, $p_{32}(-13,-1)$ represents a sequence that is from a value whose sequence number is −13 in $p_{32}$ to a value whose sequence number is −1 in $p_{32}$, and $p_{32}(1,15)$ represents a sequence that is from a value whose sequence number is 1 in $p_{32}$ to a value whose sequence number is 15 in $p_{32}$.

2. The information sending method according to claim 1 wherein the target long training sequence is in a target long training field of the PPDU, and a formula of a signal of the target long training field is as follows:

$$r_{EHT-GF-LTF}^{(i_{TX})}(t) = \frac{1}{\sqrt{N_{STS} \cdot N_{EHT-GF-LTF}^{Tone}}}$$

$$w_{T_{EHT-GF-LTF}}(t) * \sum_{k=-N_{SR}}^{N_{SR}} \sum_{i_{STS}=1}^{N_{STS}} [Q_k]_{i_{TX},i_{STS}} [P_{EHT-LTF}]_{i_{STS},1}$$

$$\gamma_k L_k \exp\left(j2\pi k\Delta_F\left(t - T_{GI} - T_{CS}^{i_{STS}}\right)\right)$$

wherein $r_{EHT-GF-LTF}$ represents the signal, t represents time, $i_{TX}$ represents an index of an antenna and is a positive integer greater than or equal to 1, STS represents a space-time stream, * represents multiplication, and $N_{STS}$ represents a number of space-time streams, $N_{EHT-GF-LTF}^{Tone}$ represents a number of subcarriers with energy in the target long training field, $W_{T_{EHT-GF-LTF}}(t)$ represents a window function of the target long training field, $N_{SR}$ represents an index of a highest data subcarrier among all data subcarriers in the target long training field, exp( ) represents calculating an exponent, $T_{CS}^{i_{STS}}$ represents duration of a circular shift, $\gamma_k$ represents a phase rotation factor, $P_{EHT-LTF}$ represents a mapping matrix of the target long training field, $Q_k$ represents a precoding matrix of a $k^{th}$ subcarrier, wherein k is a positive integer, $\Delta_F$ represents a subcarrier spacing of the target long training field, and $T_{GI}$ represents a guard interval.

3. The information sending method according to claim 2, wherein a modulation scheme of a first symbol following the target long training field in the PPDU is quadrature binary phase shift keying (QBPSK).

4. The information sending method according to claim 2, wherein the PPDU comprises a target signaling field, the target signaling field is a first field following the target long training field, an information bandwidth of the target signaling field is greater than 20 MHz, and the information bandwidth refers to a basic bandwidth for carrying information coding.

5. An information sending method comprising:
generating a physical layer protocol data unit (PPDU), wherein the PPDU comprises a target long training sequence, and the target long training sequence is orthogonal to a legacy long training sequence or orthogonal to a high throughput long training sequence; and sending the PPDU.

wherein a bandwidth is greater than 20 MHz, and an expression of the target long training sequence is any one of the following:

$L_k=[a_1 L_{64}, a_2 L_{64}, \ldots a_k L_{64}]$;

$L_{64}=[p_{32},p_{32}]$;

$L_{64}=[p_{32},-p_{32}]$;

$L_{64}=[-p_{32},p_{32}]$;

$L_{64}=[-p_{32},-p_{32}]$;

$L_{64}=[p_{32}(-16,-1),x1,p_{32}(1,13),-1,1,0,-1,-1,p_{32}(-13,-1),x2,p_{32}(1,15)]$;

$L_{64}=[p_{32}(-16,-1),x1,p_{32}(1,13),1,-1,0,1,1,p_{32}(-13,-1),x2,p_{32}(1,15)]$;

$L_{64}=[p_{32}(-16,-1),x1,p_{32}(1,13),1,-1,0,1,-1,p_{32}(-13,-1),x2,p_{32}(1,15)]$;

$L_{64}=[p_{32}(-16,-1),0,p_{32}(1,13),1,1,0,-1,-1,p_{32}(-13,-1),0,p_{32}(1,15)];$ $L_{64}=[p_{32}(-16,-1),1,p_{32}(1,13),0,0,0,0,0,p_{32}(-13,-1),1,p_{32}(1,15)];$ $L_{64}=[p_{32}(-16,-1),0,p_{32}(1,13),-1,1,0,-1,-1,p_{32}(-13,-1),0,p_{32}(1,15)];$ $L_{64}=[p_{32}(-16,-1),0,p_{32}(1,13),1,-1,0,1,1,p_{32}(-13,-1),0,p_{32}(1,15)];$ $L_{64}=[p_{32}(-16,-1),0,p_{32}(1,13),1,-1,0,1,-1,p_{32}(-13,-1),0,p_{32}(1,15)];$ or $L_{64}=[p_{32}(-16,-1,0,p_{32}(1,13),\mathbf{1,1,0,-1,-1},p_{32}(-13,-1),0,p_{32}(1,15)];$ wherein $L_k$, represents the target long training sequence, k is a ratio of a bandwidth of the PPDU to 20 MHz and is a positive integer greater than or equal to 1, $a_1$, $a_2$, and $a_k$ are −1 or 1, $L_{64}$ represents a target long training sequence whose length is 64, x1 is −1 or 1, x2 is −1, $p_{32}$=[0 0 0 1−1 1−1−1 1−1 1 1−1 1 1 1 0−1 −1 −1 1 −1−1−1 1 −1 1 1 1 −1 0 0], $p_{32}(-16,-1)$ represents a sequence that is from a value whose sequence number is −16 in $p_{32}$ to a value whose sequence number is −1 in $p_{32}$, $p_{32}(1,13)$ represents a sequence that is from a value whose sequence number is 1 in $p_{32}$ to a value whose sequence number is 13 in $p_{32}$, $p_{32}(-13,-1)$ represents a sequence that is from a value whose sequence number is −13 in $p_{32}$ to a value whose sequence number is −1 in $p_{32}$, and $p_{32}(1,15)$ represents a sequence that is from a value whose sequence number is 1 in $p_{32}$ to a value whose sequence number is 15 in $p_{32}$.

6. An information receiving method comprising:
receiving a data unit; and
in response to a long training sequence in the data unit meets a first condition, determining that the data unit is a physical layer protocol data unit (PPDU) in a preset format, wherein the PPDU comprises a target long training sequence, and the target long training sequence is orthogonal to a legacy long training sequence or orthogonal to a high throughput long training sequence.

7. The information receiving method according to claim 6, wherein determining that the data unit is a PPDU in a preset format comprises:
performing cross-correlation between the long training sequence in the data unit and a prestored target long training sequence to obtain a first result, wherein the prestored target long training sequence is orthogonal to the legacy long training sequence or orthogonal to the high throughput long training sequence; and
in response to the first result is greater than a first threshold, determining that the data unit is the PPDU in the preset format.

8. The information receiving method according to claim 6, wherein the determining that the data unit is a PPDU in a preset format comprises:
performing cross-correlation between the long training sequence in the data unit and a prestored target long training sequence to obtain a first result, wherein the prestored target long training sequence is orthogonal to the legacy long training sequence or orthogonal to the high throughput long training sequence;
performing cross-correlation between the long training sequence in the data unit and the legacy long training sequence or the high throughput long training sequence, to obtain a second result; and
in response to the first result and the second result meet a preset magnitude relationship, determining that the data unit is the PPDU in the preset format.

9. The information receiving method according to claim 8, wherein
the preset magnitude relationship is that the first result is greater than or equal to the second result; or
the preset magnitude relationship is that the first result is greater than a product of the second result and a preset coefficient.

10. The information receiving method according to claim 8, wherein after receiving the data unit, the information receiving method further comprises:
obtaining a signal to interference plus noise ratio of at least one subcarrier of a target long training field of the data unit, wherein the target long training field comprises a long training sequence;
selecting a target subcarrier from the at least one subcarrier based on the signal to interference plus noise ratio of the at least one subcarrier, wherein the target subcarrier meets a second condition;
wherein performing the cross-correlation between the long training sequence in the data unit and a prestored target long training sequence comprises:
performing, based on the target subcarrier, cross-correlation between the long training sequence in the data unit and the prestored target long training sequence; and
the performing cross-correlation between the long training sequence in the data unit and the legacy long training sequence or the high throughput long training sequence comprises:
performing, based on the target subcarrier, cross-correlation between the long training sequence in the data unit and the legacy long training sequence or the high throughput long training sequence.

11. The information receiving method according to claim 10, wherein the information receiving method further comprises:
obtaining a first sequence based on the target subcarrier, wherein the first sequence is a sequence that is in the long training sequence and that is carried by the target subcarrier;
wherein performing, based on the target subcarrier, the cross-correlation between the long training sequence in the data unit and the prestored target long training sequence comprises:
obtaining a second sequence based on the first sequence, wherein the second sequence is a sequence that is in the target long training sequence and that corresponds to the first sequence in position; and
performing cross-correlation between the first sequence and the second sequence;
wherein performing, based on the target subcarrier, the cross-correlation between the long training sequence in the data unit and the legacy long training sequence or the high throughput long training sequence comprises:
obtaining a third sequence based on the first sequence, wherein the third sequence is a sequence that is in the legacy long training sequence or the high throughput long training sequence and that corresponds to the first sequence in position; and
performing cross-correlation between the first sequence and the third sequence.

12. The information receiving method according to claim 6, wherein a bandwidth is equal to 20 megahertz (MHz), and an expression of the target long training sequence is any one of the following:

$L_{64}=[p_{32},p_{32}]$;

$L_{64}=[p_{32},-p_{32}]$;

$L_{64}=[-p_{32},p_{32}]$;

$L_{64}=[-p_{32},-p_{32}]$;

$L_{64}=[p_{32}(-16,-1),x1,p_{32}(1,13),-1,1,0,-1,-1,p_{32}(-13,-1),x2,p_{32}(1,15)]$;

$L_{64}=[p_{32}(-16,-1),x1,p_{32}(1,13),1,-1,0,1,1,p_{32}(-13,-1),x2,p_{32}(1,15)]$;

$L_{64}=[p_{32}(-16,-1),x1,p_{32}(1,13),1,1,p_{32}(-13,-1),x2,p_{32}(1,15)]$;

$L_{64}=[p_{32}(-16,-1),0,p_{32}(1,13),1,1,0,-1,-1,p_{32}(-13,-1),0,p_{32}(1,15)]$;

$L_{64}=[p_{32}(-16,-1),1,p_{32}(1,13),0,0,0,0,0,p_{32}(-13,-1),1,p_{32}(1,15)]$;

$L_{64}=[p_{32}(-16,-1),0,p_{32}(1,13),-1,1,0,-1,-1,p_{32}(-13,-1),0,p_{32}(1,15)]$;

$L_{64}=[p_{32}(-16,-1),0,p_{32}(1,13),1,-1,0,1,1,p_{32}(-13,-1),0,p_{32}(1,15)]$;

$L_{64}=[p_{32}(-16,-1),0,p_{32}(1,13),1,-1,0,1,-1,p_{32}(-13,-1),0,p_{32}(1,15)]$; or $L_{64}=[p_{32}(-16,-1),0,p_{32}(1,13),1,1,0,-1,-1,p_{32}(-13,-1),0,p_{32}(1,15)]$;

wherein $L_{64}$ represents the target long training sequence whose length is 64, x1 is -1 or 1, x2 is -1, $p_{32}$=[0 0 0 1-1 1-1-1 1-1 1 1 -1 1 1 1 0-1-1-1 1-1-1-1 1-1 1 1 1-1 0 0], $p_{32}(-16,-1)$ represents a sequence that is from a value whose sequence number is -16 in $p_{32}$ to a value whose sequence number is -1 in $p_{32}$, $p_{32}(1,13)$ represents a sequence that is from a value whose sequence number is 1 in $p_{32}$ to a value whose sequence number is 13 in $p_{32}$, $p_{32}(-13, -1)$ represents a sequence that is from a value whose sequence number is -13 in $p_{32}$ to a value whose sequence number is -1 in $p_{32}$, and $p_{32}(1,15)$ represents a sequence that is from a value whose sequence number is 1 in $p_{32}$ to a value whose sequence number is 15 in $p_{32}$.

13. The information receiving method according to claim 6, wherein a bandwidth is greater than 20 megahertz (MHz), and an expression of the target long training sequence is any one of the following:

$L_k=[a_1L_{64},a_2L_{64},\ldots a_kL_{64}]$;

$L_{64}=[p_{32},p_{32}]$;

$L_{64}=[p_{32},-p_{32}]$;

$L_{64}=[-p_{32},p_{32}]$;

$L_{64}=[-p_{32},-p_{32}]$;

$L_{64}=[p_{32}(-16,-1),x1,p_{32}(1,13),-1,1,0,-1,-1,p_{32}(-13,-1),x2,p_{32}(1,15)]$;

$L_{64}=[p_{32}(-16,-1),x1,p_{32}(1,13),1,-1,0,1,1,p_{32}(-13,-1),x2,p_{32}(1,15)]$;

$L_{64}=[p_{32}(-16,-1),x1,p_{32}(1,13),1,-1,0,1,-1,p_{32}(-13,-1),x2,p_{32}(1,15)]$;

$L_{64}=[p_{32}(-16,-1),0,p_{32}(1,13),1,1,0,-1,-1,p_{32}(-13,-1),0,p_{32}(1,15)]$;

$L_{64}=[p_{32}(-16,-1),1,p_{32}(1,13),0,0,0,0,0,p_{32}(-13,-1),1,p_{32}(1,15)]$;

$L_{64}=[p_{32}(-16,-1),0,p_{32}(1,13),-1,1,0-1,-1,p_{32}(-13,-1),0,p_{32}(1,15)]$;

$L_{64}=[p_{32}(-16,-1),0,p_{32}(1,13),1,-1,0,1,1,p_{32}(-13,-1),0,p_{32}(1,15)]$;

$L_{64}=[p_{32}(-16,-1),0,p_{32}(1,13)1,-1,0,1,-1,p_{32}(-13,-1),0,p_{32}(1,15)]$; or $L_{64}=[p_{32}(-16,-1,0,p_{32}(1,13),\mathbf{1,1,0,-1,-1},p_{32}(-13,-1),0,p_{32}(1,15)]$;

wherein $L_k$ represents the target long training sequence, k is a ratio of a bandwidth of the PPDU to 20 MHz and is a positive integer greater than or equal to 1, $a_1$, $a_2$, and $a_k$ are -1 or 1, $L_{64}$ represents a target long training sequence whose length is 64, x1 is -1 or 1, x2 is -1, $p_{32}$=[0 0 0 1-1 1-1-1 1-1 1 1 1 1 0-1-1 1-1-1-1 1-1 1 1 1-1 0 0], $p_{32}(-16,-1)$ represents a sequence that is from a value whose sequence number is -16 in $p_{32}$ to a value whose sequence number is -1 in $p_{32}$, $p_{32}(1,13)$ represents a sequence that is from a value whose sequence number is 1 in $p_{32}$ to a value whose sequence number is 13 in $p_{32}$, $p_{32}(-13,-1)$ represents a sequence that is from a value whose sequence number is -13 in $p_{32}$ to a value whose sequence number is -1 in $p_{32}$, and $p_{32}(1,15)$ represents a sequence that is from a value whose sequence number is 1 in $p_{32}$ to a value whose sequence number is 15 in $p_{32}$.

14. The information receiving method according to claim 6, wherein the target long training sequence is in a target long training field of the PPDU, a formula of a signal of the target long training field is as follows:

$$r_{EHT-GF-LTF}^{(i_{TX})}(t) = \frac{1}{\sqrt{N_{STS} \cdot N_{EHT-GF-LTF}^{Tone}}}$$

$$w_{T_{EHT-GF-LTF}}(t) * \sum_{k=-N_{SR}}^{N_{SR}} \sum_{i_{STS}=1}^{N_{STS}} [Q_k]_{i_{TX},i_{STS}} [P_{EHT-LTF}]_{i_{STS},1}$$

$$\gamma_k L_k \exp\left(j2\pi k \Delta_F \left(t - T_{GI} - T_{CS}^{i_{STS}}\right)\right)$$

wherein $r_{EHT-GF-LTF}$ represents the signal, t represents time, $i_{TX}$ represents an index of an antenna and is a positive integer greater than or equal to 1, STS represents a space-time stream, * represents multiplication, $N_{STS}$ represents a number of space-time streams, $N_{EHT-GF-LTF}^{Tone}$ represents a number of subcarriers with energy in the target long training field, $w_{T_{EHT-GF-LTF}}(t)$ represents a window function of the target long training field, $N_{SR}$ represents an index of a highest data subcarrier among all data subcarriers in the target long training field, exp( ) represents calculating an exponent, $T_{CS}^{i_{STS}}$ represents duration of a circular shift, $\gamma_k$ represents a phase rotation factor, $p_{EHT-LTF}$ represents a mapping matrix of the target long training field, $Q_k$ represents a precoding matrix of a $k^{th}$ subcarrier, wherein k is a positive integer, $\Delta_f$ represents a subcarrier spacing of the target long training field, and $T_{GI}$ represents a guard interval.

15. The information receiving method according to claim 14, wherein a modulation scheme of a first symbol following the target long training field in the PPDU is quadrature binary phase shift keying (QBPSK), and the target long training field comprises the long training sequence.

16. The information receiving method according to claim 15, wherein the PPDU comprises a target signaling field, the target signaling field is a first field following the target long training field, an information bandwidth of the target signaling field is greater than 20 MHz, the information bandwidth is a basic bandwidth for carrying information encoding, and the target long training field comprises the long training sequence.

* * * * *

UNITED STATES PATENT AND TRADEMARK OFFICE
CERTIFICATE OF CORRECTION

PATENT NO. : 12,095,604 B2  
APPLICATION NO. : 17/466637  
DATED : September 17, 2024  
INVENTOR(S) : Jian Yu Page 1 of 2

It is certified that error appears in the above-identified patent and that said Letters Patent is hereby corrected as shown below:

In the Claims

In Column 48, In Line 64, In Claim 1, before "An" delete "The".

In Column 49, In Line 27, In Claim 1, delete "1–1" and insert -- 1,–1 --.

In Column 49, In Line 36, In Claim 1, delete "0–1" and insert -- 0,–1 --.

In Column 49, In Line 42, In Claim 1, delete ")1" and insert -- ), 1 --.

In Column 49, In Line 46, In Claim 1, delete "(–16,–1," and insert -- (–16,–1), --.

In Column 50, In Line 47, In Claim 5, delete "PPDU." and insert -- PPDU, --.

In Column 50, In Line 66, In Claim 5, delete "1–1" and insert -- 1,–1 --.

In Column 51, In Line 7, In Claim 5, delete "0–1" and insert -- 0,–1 --.

In Column 51, In Line 12, In Claim 5, delete ")1" and insert -- ),1 --.

In Column 51, In Line 16, In Claim 5, delete "(–16,–1," and insert -- (–16,–1), --.

In Column 53, In Line 19, In Claim 12, delete "1,1" and insert -- 1,–1,0,1,–1 --.

In Column 53, In Line 21, In Claim 12, delete "0," and insert -- x1, --.

In Column 53, In Line 22, In Claim 12, delete "0," and insert -- x2, --.

In Column 53, In Line 24, In Claim 12, delete "1," and insert -- x1, --.

Signed and Sealed this  
Seventeenth Day of December, 2024

Derrick Brent  
*Acting Director of the United States Patent and Trademark Office*

In Column 53, In Line 24, In Claim 12, delete "1," and insert -- x2, --.

In Column 53, In Line 39, In Claim 12, after "–1" insert -- 1–1–1–1 --.

In Column 54, In Line 4, In Claim 13, delete "1–1" and insert -- 1,–1 --.

In Column 54, In Line 12, In Claim 13, delete "0–1" and insert -- 0,–1 --.

In Column 54, In Line 18, In Claim 13, delete ")1" and insert -- ),1 --.

In Column 54, In Line 20, In Claim 13, delete "(–16,–1," and insert -- (–16,–1), --.